US012416727B2

(12) United States Patent
Xu et al.

(10) Patent No.: US 12,416,727 B2
(45) Date of Patent: Sep. 16, 2025

(54) ONLINE POINT CLOUD PROCESSING OF LIDAR AND CAMERA DATA

(71) Applicant: SZ DJI TECHNOLOGY CO., LTD., Guangdong (CN)

(72) Inventors: Jifei Xu, Palo Alto, CA (US); Feng Cao, Guangdong (CN); Arjun Sukumar Menon, San Jose, CA (US); Weifeng Liu, Fremont, CA (US)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 1140 days.

(21) Appl. No.: 17/339,679

(22) Filed: Jun. 4, 2021

(65) Prior Publication Data
US 2022/0113421 A1    Apr. 14, 2022

Related U.S. Application Data

(63) Continuation of application No. PCT/CN2020/120642, filed on Oct. 13, 2020.

(51) Int. Cl.
*G01S 17/89* (2020.01)
*B64C 39/02* (2023.01)
(Continued)

(52) U.S. Cl.
CPC ............ *G01S 17/89* (2013.01); *G01S 7/4808* (2013.01); *G01S 17/42* (2013.01); *B64U 10/14* (2023.01);
(Continued)

(58) Field of Classification Search
CPC ........ G01S 17/89; G01S 17/42; G01S 7/4808; B64C 39/024; B64C 2201/123;
(Continued)

(56) References Cited

U.S. PATENT DOCUMENTS

| | | | |
|---|---|---|---|
| 10,552,560 B2* | 2/2020 | Brooks | G06F 9/45537 |
| 2003/0135327 A1* | 7/2003 | Levine | G01S 19/49 |
| | | | 342/357.65 |

(Continued)

FOREIGN PATENT DOCUMENTS

| | | |
|---|---|---|
| CN | 111033415 A | 4/2020 |
| CN | 111091166 A | 5/2020 |

(Continued)

OTHER PUBLICATIONS

International Search Report and Written Opinion, PCT App. No. PCT/CN2020/120642, Jul. 9, 2021, 10 pages.

*Primary Examiner* — Daniel L Murphy
(74) *Attorney, Agent, or Firm* — ANOVA LAW GROUP, PLLC

(57) ABSTRACT

Techniques are disclosed for mapping in a movable object environment. A system may comprise a movable object, a payload coupled to the movable object, the payload comprising an embedded system including an embedded processor, a scanning sensor, one or more cameras, and an inertial navigation system (INS). The payload further including an online processing application, the online processing application including instructions which, when executed by the embedded processor, cause the online processing application to obtain mapping data from the scanning sensor, obtain image data from a camera of the one or more cameras, obtain positioning data from the INS, associate the mapping data with the positioning data to generate georeferenced data, downsample the georeferenced data to generate downsampled georeferenced data, and provide the downsampled georeferenced data to a client device to be visualized on the client device in real-time.

20 Claims, 15 Drawing Sheets

(51) Int. Cl.
  *G01S 7/48*   (2006.01)
  *G01S 17/42*  (2006.01)
  *B64U 10/14*  (2023.01)
  *B64U 101/32* (2023.01)

(52) U.S. Cl.
  CPC .... *B64U 2101/32* (2023.01); *B64U 2201/104* (2023.01); *B64U 2201/20* (2023.01)

(58) Field of Classification Search
  CPC ........ B64C 2201/146; B64C 2201/145; B64C 2201/128; B64C 2201/127; B64U 2201/20; B64U 2201/104; B64U 10/14; B64U 2101/32; B64U 2201/00
  USPC ....................................................... 356/5.01
  See application file for complete search history.

(56) References Cited

U.S. PATENT DOCUMENTS

| | | | |
|---|---|---|---|
| 2018/0189574 A1 | 7/2018 | Brueckner et al. | |
| 2019/0258878 A1 | 8/2019 | Koivisto et al. | |
| 2019/0346271 A1* | 11/2019 | Zhang | G05D 1/245 |

FOREIGN PATENT DOCUMENTS

| | | |
|---|---|---|
| CN | 111148967 A | 5/2020 |
| WO | 2020/092178 A1 | 5/2020 |

\* cited by examiner

ONLINE POINT CLOUD PROCESSING OF LIDAR AND CAMERA DATA

CROSS REFERENCE TO RELATED APPLICATIONS

This application is a continuation of International Application PCT/CN2020/120642, filed Oct. 13, 2020, entitled, "ONLINE POINT CLOUD PROCESSING OF LIDAR AND CAMERA DATA" which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosed embodiments relate generally to techniques for mapping and more particularly, but not exclusively, to techniques for online point cloud processing of LiDAR and camera data.

BACKGROUND

Movable objects such as unmanned aerial vehicles (UAVs) can be used for performing surveillance, reconnaissance, and exploration tasks for various applications. Movable objects may carry a payload, including various sensors, which enables the movable object to capture sensor data during movement of the movable objects. The captured sensor data may be rendered on a client device, such as a client device in communication with the movable object via a remote control, remote server, or other computing device.

SUMMARY

Techniques are disclosed for mapping in a movable object environment. A system may comprise a movable object, a payload coupled to the movable object, the payload comprising an embedded system including an embedded processor, a scanning sensor, one or more cameras, and an inertial navigation system (INS). The payload further including an online processing application, the online processing application including instructions which, when executed by the embedded processor, cause the online processing application to obtain mapping data from the scanning sensor, obtain image data from a camera of the one or more cameras, obtain positioning data from the INS, associate the mapping data and the image data with the positioning data to generate georeferenced data, downsample the georeferenced data to generate downsampled georeferenced data, and provide the downsampled georeferenced data to a client device to be visualized on the client device in real-time.

DETAILED DESCRIPTION

Figure 1:
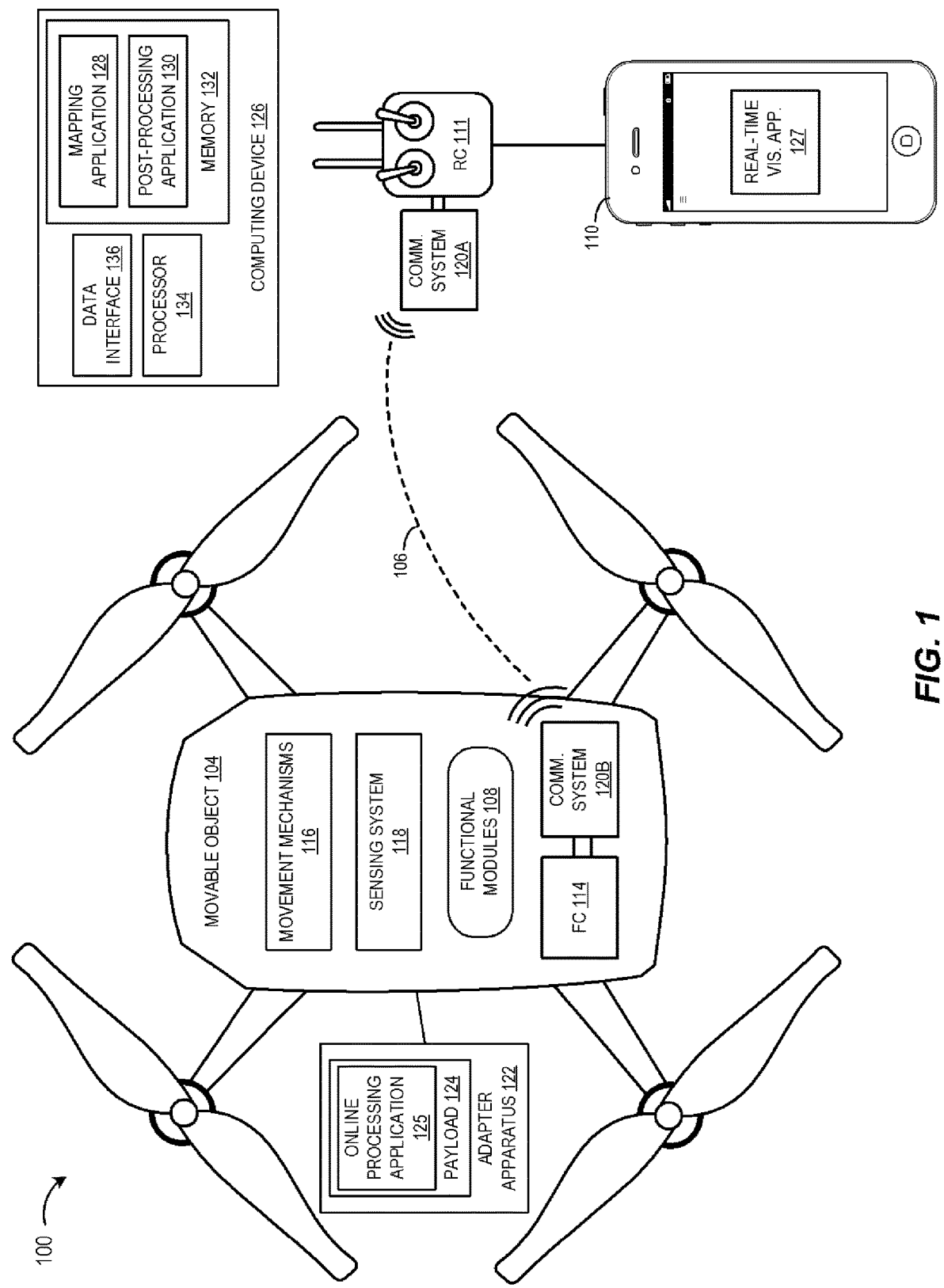
FIG. 1 illustrates an example of a movable object in a movable object environment, in accordance with various embodiments.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The following description of the invention describes target mapping using a movable object. For simplicity of explanation, an unmanned aerial vehicle (UAV) is generally used as an example of a movable object. It will be apparent to those skilled in the art that other types of movable objects can be used without limitation.

Light detection and ranging (LiDAR) sensors can be used to generate very accurate maps of a target environment. However, LiDAR sensors produce a significant amount of data that is generally not readily viewed by a person right out of the box. Instead, in conventional systems, significant configuration of the LiDAR sensor, along with additional sensors such as positioning sensors or imaging sensors, along with significant post-processing of the collected data is needed to yield a map that can be usefully interpreted and/or used by a human for various applications. For example, a LiDAR sensor may collect mapping data relative to the LiDAR sensor, and requires a highly accurate inertial navigation system to generate mapping data that can be transformed into a useful coordinate system (e.g., such as a global coordinate system). As such, to obtain useful mapping data, the complexity of the system and the complexity of the post-processing increases quite rapidly along with the cost of all of the components that are needed.

If such a system is successfully constructed and a mapping mission successfully performed, the user is left with a significant amount of raw data. Conventional systems must post-process this raw data into a form that is usable. This post-processing step can take days or weeks to complete depending on the amount of data collected. Additionally, if data is still needed (e.g., if it is later learned that the initial mapping mission is incomplete, then additional missions must be flown with additional post-processing time required, before it can be determined if all the needed data has been collected.

Embodiments enable processing of mapping data to be distributed between an online processing application and a post processing application. This enables the high-processing requirements of survey-grade precision to be done in post-processing, while online processing allows the user to get real-time feedback regarding the current mapping mission. Additionally, as discussed, online processing writes raw sensor data in real-time to removable storage medium, which enables the user to provide the sensor data to a computer for post-processing after completion of the mission. In some embodiments, online processing of mapping data can be performed by a movable object while mapping a target environment using a payload that comprises a plurality of sensors. For example, the payload can include a scanning sensor, one or more cameras, and an inertial navigation system (INS). This payload can be connected to a UAV through a single port which provides a mechanical mounting point as well as managing power and data communication with the payload. Using an embedded processor, such as a DSP, CPU, GPU, FPGA, or other processor or accelerator, the payload can obtain mapping data from the scanning sensor, obtain image data from a camera of the one or more cameras, obtain positioning data from the INS, associate the mapping data and the image data with the positioning data based at least on a common reference clock signal to generate geo-referenced data, and store the geo-referenced data to a removable storage medium. In some embodiments, the embedded processor can be integrated with the plurality of sensors such that the embedded processor and sensors are all connected to the same circuit board (e.g., a PCB, etc.). In such embodiments, clock circuitry embedded on the same circuit board are shared by the embedded processor and the sensors, which provides a common reference clock signal for time synchronization among various sensors and the embedded processor. This simplifies time synchronization between the data streams of the various sensors without requiring a separate hardware synchronization mechanism for each sensor. Additionally, the payload can include an online processing application which executes on the embedded processor to process mapping data such that it can be visualized in real-time.

In addition to the online processing of the mapping data performed by the payload, the raw sensor data can also be stored locally on the payload or the UAV via a storage medium. Once a scanning mission is complete (e.g., after the movable object has finished a mission, collected mapping data, and returned home) the raw sensor data can be obtained from a removable media in the payload or the UAV. For example, a secure digital (SD) card can store the raw image data and raw mapping data, be removed from the payload or the UAV, and read by a card reader, or other data interface, of a computing device. The computing device may include a post-processing application and a mapping application. The post-processing application can obtain the feature data and the geo-referenced data from the raw image data and the raw mapping data stored in the removable storage medium to generate at least one local map based on the feature data and the geo-referenced data. The post processing application can use the local maps to generate an optimized dense map for which accuracy has been improved and noise has been reduced that has been colorized based on image data collected by at least one camera (e.g., an RGB camera) of the payload. The post-processing application can also change the coordinate system of the dense map based on user input. The resulting dense map can be visualized using the mapping application.

FIG. 1 illustrates an example of a movable object in a movable object environment 100, in accordance with various embodiments. As shown in FIG. 1, client device 110 in a movable object environment 100 can communicate with a movable object 104 via a communication link 106. The movable object 104 can be an unmanned aircraft, an unmanned vehicle, a handheld device, and/or a robot. The client device 110 can be a portable personal computing device, a smart phone, a remote control, a wearable computer, a virtual reality/augmented reality system, and/or a personal computer. Additionally, the client device 110 can include a remote control 111 and communication system 120A, which is responsible for handling the communication between the client device 110 and the movable object 104 via communication system 120B. For example, the communication between the client device 110 and the movable object 104 (e.g., an unmanned aircraft) can include uplink and downlink communication. The uplink communication can be used for transmitting control signals or commands, the downlink communication can be used for transmitting media or video stream, mapping data collected by scanning sensors, or other sensor data collected by other sensors.

In accordance with various embodiments, the communication link 106 can be (part of) a network, which is based on various wireless technologies, such as the WiFi, Bluetooth, 3G/4G, and other radio frequency technologies. Furthermore, the communication link 106 can be based on other computer network technologies, such as the internet technology, or any other wired or wireless networking technology. In some embodiments, the communication link 106 may be a non-network technology, including direct point-to-point connections such as universal serial bus (USB) or universal asynchronous receiver-transmitter (UART).

In various embodiments, movable object 104 in a movable object environment 100 can be coupled to an adapter apparatus 122 and a payload 124, such as a scanning sensor (e.g., a LiDAR sensor), camera(s), and/or a collection of sensors in a single payload unit. In various embodiments, the adapter apparatus 122 includes a port for coupling the payload 124 to the movable object 104 which provides power, data communications, and structural support for the payload 124. Although the movable object 104 is described generally as an aircraft, this is not intended to be limiting, and any suitable type of movable object can be used. One of skill in the art would appreciate that any of the embodiments described herein in the context of aircraft systems can be applied to any suitable movable object (e.g., a UAV, automobile, handheld device, etc.). In some instances, the payload 124 may be coupled to the movable object 104 without requiring the adapter apparatus 122.

In accordance with various embodiments, the movable object 104 may include one or more movement mechanisms 116 (e.g., propulsion mechanisms), a sensing system 118, and a communication system 120B. The movement mechanisms 116 can include one or more of rotors, propellers, blades, engines, motors, wheels, axles, magnets, nozzles, animals, or human beings. For example, the movable object may have one or more propulsion mechanisms. The movement mechanisms may all be of the same type. Alternatively, the movement mechanisms can be different types of movement mechanisms. The movement mechanisms 116 can be mounted on the movable object 104 (or vice-versa), using any suitable means such as a support element (e.g., a drive shaft). The movement mechanisms 116 can be mounted on any suitable portion of the movable object 104, such on the top, bottom, front, back, sides, or suitable combinations thereof.

In some embodiments, the movement mechanisms 116 can enable the movable object 104 to take off vertically from a surface or land vertically on a surface without requiring any horizontal movement of the movable object 104 (e.g., without traveling down a runway). Optionally, the movement mechanisms 116 can be operable to permit the movable object 104 to hover in the air at a specified position and/or orientation. One or more of the movement mechanisms 116 may be controlled independently of the other movement mechanisms, for example by an application executing on client device 110 or other computing device in communication with the movement mechanisms. Alternatively, the movement mechanisms 116 can be configured to be controlled simultaneously. For example, the movable object 104 can have multiple horizontally oriented rotors that can provide lift and/or thrust to the movable object. The multiple horizontally oriented rotors can be actuated to provide vertical takeoff, vertical landing, and hovering capabilities to the movable object 104. In some embodiments, one or more of the horizontally oriented rotors may spin in a clockwise direction, while one or more of the horizontally oriented rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 104 (e.g., with respect to up to three degrees of translation and up to three degrees of rotation). As discussed further herein, a controller, such as flight controller 114, can send movement commands to the movement mechanisms 116 to control the movement of movable object 104. These movement commands may be based on and/or derived from instructions received from client device 110 or other entity.

The sensing system 118 can include one or more sensors that may sense the spatial disposition, velocity, and/or acceleration of the movable object 104 (e.g., with respect to various degrees of translation and various degrees of rotation). The one or more sensors can include any of the sensors, including GPS sensors, real-time kinematic (RTK) sensors, motion sensors, inertial sensors, proximity sensors, or image sensors. The sensing data provided by the sensing system 118 can be used to control the spatial disposition, velocity, and/or orientation of the movable object 104 (e.g., using a suitable processing unit and/or control module). Alternatively, the sensing system 118 can be used to provide data regarding the environment surrounding the movable object, such as weather conditions, proximity to potential obstacles, location of geographical features, location of manmade structures, and the like.

The communication system 120B enables communication with client device 110 via communication link 106, which may include various wired and/or wireless technologies as discussed above, and communication system 120A. The communication system 120A or 120B may include any number of transmitters, receivers, and/or transceivers suitable for wireless communication. The communication may be one-way communication, such that data can be transmitted in only one direction. For example, one-way communication may involve only the movable object 104 transmitting data to the client device 110, or vice-versa. The data may be transmitted from one or more transmitters of the communication system 120B of the movable object 104 to one or more receivers of the communication system 120A of the client device 110, or vice-versa. Alternatively, the communication may be two-way communication, such that data can be transmitted in both directions between the movable object 104 and the client device 110. The two-way communication can involve transmitting data from one or more transmitters of the communication system 120B of the movable object 104 to one or more receivers of the communication system 120A of the client device 110, and transmitting data from one or more transmitters of the communication system 120A of the client device 110 to one or more receivers of the communication system 120B of the movable object 104.

In some embodiments, an application executing on client device 110 or other computing devices that are in communication with the movable object 104 can provide control data to one or more of the movable object 104, adapter apparatus 122, and payload 124 and receive information from one or more of the movable object 104, adapter apparatus 122, and payload 124 (e.g., position and/or motion information of the movable object, adapter apparatus or payload; data sensed by the payload such as image data captured by one or more payload cameras or mapping data captured by a payload LiDAR sensor; and data generated from image data captured by the payload camera or LiDAR data generated from mapping data captured by the payload LiDAR sensor).

In some embodiments, the control data may result in a modification of the location and/or orientation of the movable object (e.g., via control of the movement mechanisms 116), or a movement of the payload with respect to the movable object (e.g., via control of the adapter apparatus 122). The control data from the application may result in control of the payload, such as control of the operation of scanning sensor 124, a camera or other image capturing device (e.g., taking still or moving pictures, zooming in or out, turning on or off, switching imaging modes, changing image resolution, changing focus, changing depth of field, changing exposure time, changing viewing angle or field of view, adding or removing waypoints, etc.).

In some instances, the communications from the movable object, adapter apparatus and/or payload may include information obtained from one or more sensors (e.g., of the sensing system 118 or of the scanning sensor 124 or other payload) and/or data generated based on the sensing information. The communications may include sensed information obtained from one or more different types of sensors (e.g., GPS sensors, RTK sensors, motion sensors, inertial sensors, proximity sensors, or image sensors). Such information may pertain to the position (e.g., location, orientation), movement, or acceleration of the movable object, adapter apparatus, and/or payload. Such information from a payload may include data captured by the payload or a sensed state of the payload.

In some embodiments, the movable object 104 and/or payload 124 can include one or more processors, such as DSPs, CPUs, GPUs, field programmable gate arrays (FPGAs), system on chip (SoC), application-specific integrated circuit (ASIC), or other processors and/or accelerators. In some embodiments, the embedded processor is a multi-core DSP. As discussed, the payload may include various sensors integrated into a single payload, such as a LiDAR sensor, one or more cameras, an inertial navigation system, etc. The sensors and the embedded processor are coupled to a shared circuit board. In some embodiments, the sensors and the embedded processor may connect to clock circuitry embedded on the shared circuit board, and thus share a common reference clock signal provided by the clock circuitry for time synchronization. This simplifies the timing synchronization between sensors. For example, synchronization between sensors can be provided via a "hardware sync" and a "software data sync" line. The sensor data from Sensor1 with timestamp is received approximately 0.5 second (this may vary depending on sensors) before the hardware sync is received. This information is received by Sensor2 that is attempting to sync both sensors. The synchronization algorithm software running on Sensor2 assumes that when the next hardware pulse is high, it can take the last sensor data with timestamp received from Sensor1 and assume it was collected when the hardware sync pulse was high. When the hardware sync was high, Sensor2 also collects its own timestamped sensor data. Sensor1 and Sensor2 timestamped data can be assumed to have been collected at the same time through this synchronization method. The payload can collect sensor data that is used to provide LiDAR based mapping for various applications, such as construction, surveying, target inspection, etc. In some embodiments, lower resolution maps can be generated in real-time through an online processing application 125 and higher resolution maps can be generated by post-processing the sensor data collected by the payload 124 through a post processing application 130.

As discussed, the payload can further include an online processing application 125. The online processing application can include various point cloud processing techniques that are simplified as compared to conventional post-processing techniques. Because a real-time view is not expected to include the precision of a post-processed view, the online processing can be simplified by reducing (e.g., downsampling) the mapping data such that there are fewer points to be processed. Additionally, INS data can also be processed in real time such that the position data and RTK data are fused and made available to the online processing application. Using the fused INS data, the online processing application can georeference the downsampled mapping data. In some embodiments, the online processing application can colorize the georeferenced mapping data using color data obtained from the RGB camera, intensity data, height data, or other data that can be represented by color values. Once the mapping data has been processed by the online processing application 125, it can be made available to a real-time visualization application 127 on a client device 110 such as a smart phone, a laptop, or a personal computer. In some embodiments, the online processed mapping data can be streamed to the client device, without requiring it to be first stored as a file. This allows the user to check for coverage (e.g., to ensure the target area has been completely mapped), perform coarse measurements of objects and/or portions of the target environment in the mapping data, etc., all in real-time.

As discussed, in addition to online processing of the mapping data, the payload also enables the raw mapping data to be stored locally to the storage media on the payload or the UAV for subsequent post-processing. In various embodiments, once a mapping mission is complete, sensor data may be obtained from the payload 124 and provided to computing device 126 for post-processing. For example, the payload 124 or the movable object 104 that is in communication with the payload 124 via the adapter apparatus 122 may include removable media, such as a secure digital (SD) card or other removable media such as flash memory-based memory devices. The removable media can store sensor data of a mapping mission obtained from the payload 124. In some embodiments, the computing device 126 can be disposed off-board the movable object 104, such as at a ground terminal, the remote control 111, the client device 110, or other remote terminals. In such embodiments, the computing device 126 can include a data interface 136, such as a card reader, which can read the sensor data stored on the removable media. In other embodiments, the computing device 126 can be disposed onboard the movable object 104, such as at the payload 124 or within the movable object 104. In such embodiments, the computing device 126 can include a data interface 136, which can read the sensor data from an onboard memory of the payload 124 or the movable object 104, or from the removable media through an onboard card reader. In some embodiments, the computing device 126 can operate on the data stored on the removable media directly or store a local copy, such as in memory 132, on disk (not shown) or other storage location accessible to the computing device 126, such as an attached storage device, network storage location, etc. The computing device 126 can include one or more processors 134, such as CPUs, GPUs, field programmable gate arrays (FPGAs), system on chip (SoC), application-specific integrated circuit (ASIC), or other processors and/or accelerators. As shown, memory 132 can include a mapping application 128 to show visualizations of the post-processed scanning data generated by a post-processing application 130.

As discussed, the sensor data can include scanning data obtained from a LiDAR sensor or other sensor that provides high resolution scanning of a target environment, pose data indicating the attitude of the payload when the scanning data was obtained (e.g., from an inertial measurement unit), and positioning data from a positioning sensor (e.g., a GPS module, RTK module, or other positioning sensor), where the sensors providing the sensor data are all incorporated into a single payload 124 and connected to the same circuit board (e.g., a PCB, etc.). In some embodiments, various sensors incorporated into the single payload 124 can be pre-calibrated based on extrinsic and intrinsic parameters of the sensors and synchronized based on a reference clock signal shared among the various sensors. The reference clock signal may be generated by time circuitry associated with the various sensors and embedded on the same circuit board. In some embodiments, the positioning data from the positioning sensor may be updated based on correction data received from a positioning sensor of the movable object 104 which may be included in functional modules 108, sensing system 118, or a separate module coupled to movable object 104 which provides positioning data for the movable object. The scanning data can be geo-referenced using the positioning data and used to construct the map of the target environment.

The geo-referenced scanning data and the payload pose data can be provided to the post-processing application 130 for post-processing into a human readable form, as discussed further below. In some embodiments, the post-processing application 130 can output an optimized map as a LiDAR Data Exchange File (LAS) or a Polygon (PLY) file which may be used by various tools, such as mapping application 128, to render the map of the target environment and/or use the mapping data for further processing, planning, etc. Metadata embedded in the LAS or PLY output file can facilitate integration of the map with various third-party tools. In various embodiments, the map may be output in various file formats depending on user preferences. In some embodiments, the post-processing application 130 may generate representation data of the mapping data, such as a thumbnail image of the LAS or PLY output file, which provides a preview of the LAS or PLY output file to be visualized using the mapping application 128.

Additional details of the movable object architecture are described below with respect to FIG. 2.

Figure 2:
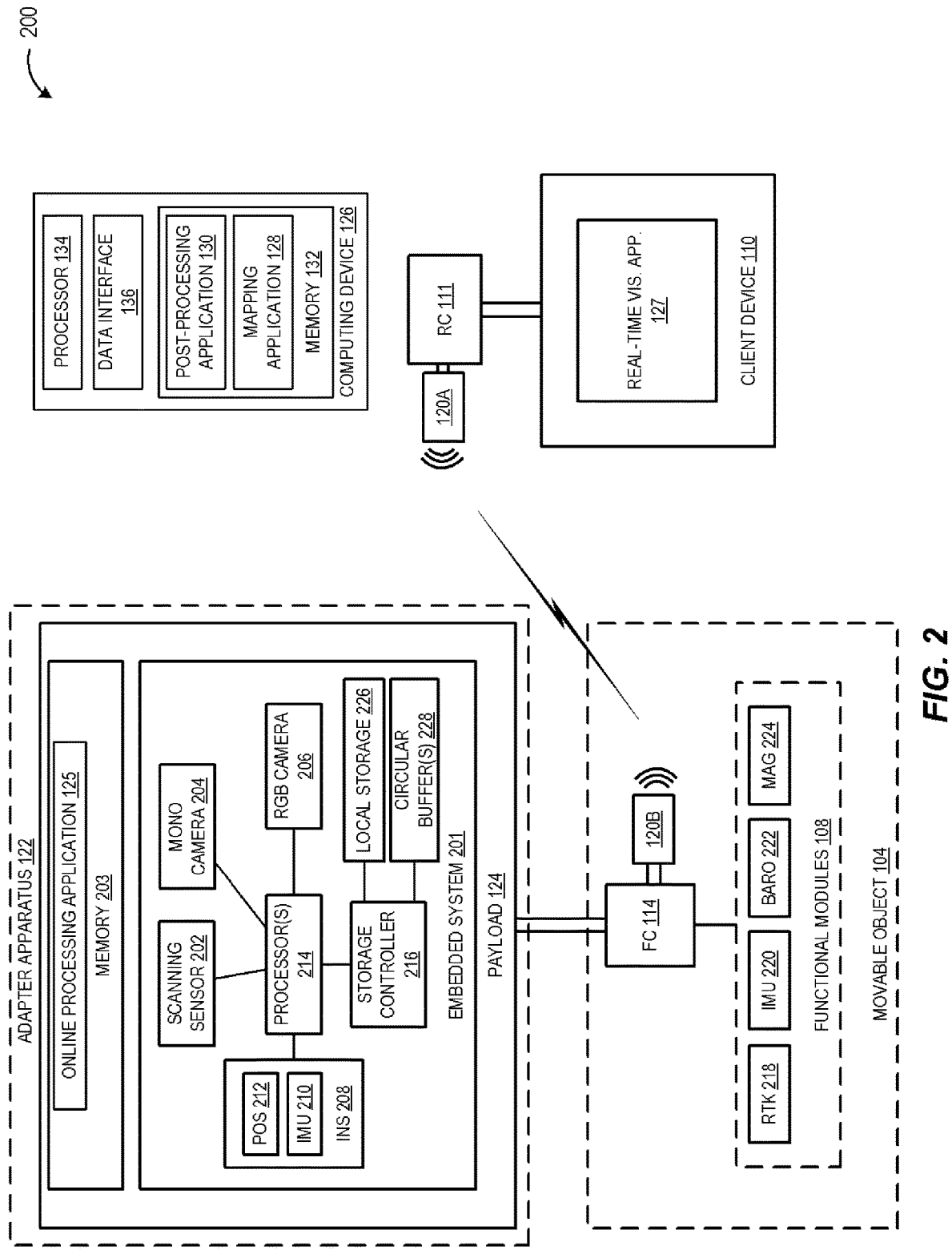
FIG. 2 illustrates an example of a movable object architecture in a movable object environment, in accordance with various embodiments.

FIG. 2 illustrates an example 200 of a movable object architecture in a movable object environment, in accordance with various embodiments. As shown in FIG. 2, a movable object 104 can include a flight controller 114 that communicates with payload 124 via adapter apparatus 122. Additionally, the flight controller 114 can communicate with various functional modules 108 onboard the movable object 104. As discussed further below, the adapter apparatus 122 can facilitate communication between the flight controller 114 and the payload 124 via a high bandwidth connection, such as Ethernet or universal serial bus (USB). The adapter apparatus 122 can further provide power to the payload 124.

As shown in FIG. 2, the payload may include an embedded system 201 which comprises a plurality of sensors, including a scanning sensor 202, a monocular camera 204, an RGB camera 206, an inertial navigation system 208 which may include an inertial measurement unit 210 and a positioning sensor 212, one or more processors 214, a storage controller 216, local storage 226, and circular buffer(s) 228. The various components of the embedded system 201 can be coupled to a shared circuit board. By using an embedded system with reduced processing versus a full computer, the resulting system has a smaller footprint, allowing a smaller payload to be used. This improves flight characteristics, reduces heat dissipation needs, and provides better integration with other sensor processing modules.

In some embodiments, scanning sensor 202 may include a LiDAR sensor. The LiDAR sensor may provide high resolution scanning data of a target environment. Various LiDAR sensors may be incorporated into the payload, having various characteristics. For example, the LiDAR sensor may have a field of view of approximately 70 degrees and may implement various scanning patterns, such as a seesaw pattern, an elliptical pattern, a petal pattern, etc. In some embodiments, a lower density LiDAR sensor can be used in the payload, as higher density point clouds require additional processing time. In some embodiments, the payload may implement its components on a single embedded board. The payload may further provide thermal management for the components.

The payload may further include a greyscale monocular camera 204. The monocular camera 204 may include a mechanical shutter that is synchronized with the inertial navigation system (INS) 208 such that when an image is captured by the monocular camera, the attitude of the payload at that moment is associated with the image data. This enables visual features (walls, corners, points etc.) to be extracted from image data captured by the monocular camera 204. For example, the visual features that are extracted can be associated with a pose-timestamp signature that is generated from the attitude data produced by the INS. Using the pose-timestamped feature data, visual features can be tracked from one frame to another, which enables a trajectory of the payload (and as a result, the movable object) to be generated. This allows for navigation in areas with limited signal from satellite-based positioning sensors, such as indoors or when RTK data is weak or otherwise unavailable. In some embodiments, the payload may further include an RGB camera 206. The RGB camera can collect live image data that is streamed to the client device 110 while the movable object is in flight. For example, the user can select whether to view image data collected by one or more cameras of the movable object or the RGB camera of the payload through a user interface of the client device 110. Additionally, color data can be obtained from image data collected by the RGB camera and overlaid on the point cloud data collected by the scanning sensor. This provides improved visualizations of the point cloud data that more closely resemble the actual objects in the target environment being scanned.

As shown in FIG. 2, the payload can further include an inertial navigation system 208. The INS 208 can include an inertial measurement unit 210 and optionally a positioning sensor 212. The IMU 210 provides the attitude of the payload which can be associated with the scanning data and image data captured by the scanning sensor and cameras, respectively. The positioning sensor 212 may use a global navigation satellite service, such as GPS, GLOSNASS, Galileo, BeiDou, etc. In some embodiments, the positioning data collected by the positioning sensor 212 may be enhanced using an RTK module 218 onboard the movable object to enhance positioning data collected by INS 208. In some embodiments, RTK information can be received wirelessly from one or more base stations. The antenna of the RTK module 218 and the payload are separated by a fixed distance on the movable object, allowing the RTK data collected by the RTK module 218 to be transformed into the IMU frame of the payload. Alternatively, the payload 124 may not include its own positioning sensor 212 and instead may rely on a positioning sensor and RTK module 218 of the movable object, e.g., included in functional modules 108. For example, positioning data may be obtained from the RTK module 218 of the movable object 104 and may be combined with the IMU data. The positioning data obtained from the RTK module 218 can be transformed based on the known distance between the RTK antenna and the payload.

As shown in FIG. 2, the payload can include one or more processors 214. The one or more processors may include an embedded processor that includes a CPU and DSP as an accelerator. In some embodiments, other processors may be used such as GPUs, FPGAs, etc. The processors can process sensor data collected by the scanning sensor, cameras, and INS, and generate a live visualization of the sensor data. For example, the processor can geo-reference the scanning data using the INS data. The geo-referenced scanning data can then be downsampled to a lower resolution for visualization on client device 110. The processor(s) 214 can also manage storage of the sensor data to one or more storage devices using storage controller 216. The storage device(s) can include a secure digital (SD) card or other removable media, a solid-state drive (SSD), an eMMC, and/or a memory. For example, one or more circular buffers 228 can be allocated in memory of the payload. The circular buffers can be of a fixed size and can store mapping data as it is obtained by the scanning sensor. If the circular buffers are full, then all of some of the oldest data in the circular buffers 228 can be overwritten by new data. For example, in some embodiments, the oldest data can be overwritten by new data. Alternatively, random mapping data from older blocks of the circular buffers can be overwritten with new data. This allows for new data to be recorded without losing all of the oldest data. Additionally, as discussed, the raw mapping data, position data, etc. can be stored to local storage 226 using storage controller 216. The raw mapping data, position data, etc. can be retrieved from the local storage at the end of a mapping mission to be post-processed by computing device 126. For example, the local storage 226 can be a removable storage medium, such as an SD card. In some embodiments, the processor can also be used to perform visual inertial odometry (VIO) using the image data collected by the monocular camera 204. This may be performed in real-time to calculate the visual features which are then stored in a storable format (not necessarily as images) to be used for post processing. For example, visual features in the target environment can be extracted from the image data to perform VIO. The visual features can be stored along with corresponding attitude information. VIO manager can be performed based on the extracted visual features and the attitude information. This can be used for navigation of the movable object in areas of weak or no RTK signal by creating a trajectory of the environment based on the movement of the visual features in the image data and changes in attitude of the payload. In some embodiments, log data may be stored to an eMMC and debugging data can be stored to an SSD. In some embodiments, the processor(s) can include an encoder/decoder built in for processing image data captured by the RGB camera.

The flight controller 114 can send and receive data to and from the remote control via communication system 120B. Flight controller 114 can connect to various functional modules 108, such as RTK module 218, IMU 220, barometer 222, or magnetometer 224. In some embodiments, communication system 120B can connect to other computing devices instead of, or in addition to, flight controller 114. In some embodiments, sensor data collected by the one or more functional modules 108 can be passed from the flight controller 114 to the payload 124 to be processed by the embedded system 201.

During a mapping mission, the user can receive data from and provide commands to the UAV using a real-time visualization application 127 on client device 110. The real-time visualization application can display a visualization of the mapping that has been performed so far. For example, the embedded system 201 can online process the mapping data as it is received. This can include geo-referencing the scanning data and the image data using the positioning data and then downsampling the resulting geo-referenced mapping data. The down-sampled data can be wirelessly transmitted to the real-time visualization application 127 using communication system 120B via flight controller 114. The real-time visualization application 127 can then display a visual representation of the down-sampled data. This enables a user to visualize how much and/or what portions of a target environment have been scanned to determine what portions still need to be scanned, etc.

Once a mapping mission is complete and the UAV has returned home, the mapping data collected and processed by the payload can be obtained from the removable storage medium on the payload or on the UAV. The removable media can be provided to a computing device 126 where it is read by a data interface 136. For example, where the removable media is an SD card, the data interface 136 may be a card reader. The computing device 126 can include a mapping application 128 to visualize mapping data and a post-processing application 130 to process the raw mapping data into a form that can be visualized. In some embodiments, the post-processing application 130 can be optimized for processing data from the scanning sensor of the payload. Because the payload includes a single scanning sensor having fixed characteristics, the post processing application can be optimized for those characteristics, such as scanning density, etc. Post-processing may include high precision post processing which is performed on higher density georeferenced mapping data as compared to the online processing. Additionally, the positioning data may be of higher quality as there is no need to process the INS data in real-time. In some embodiments, high precision post processing can also make use of more complex and longer running time optimization algorithms such as G2O.

In some embodiments, post-processing may include receiving the geo-referenced point cloud data and the payload pose data and constructing a plurality of local maps. In some embodiments, the local maps may be constructed using an iterative closest matching (ICP) module or other module implementing a matching algorithm. In various embodiments, rather than first extracting features from the scans and using these features to match the scans and build the local maps, the ICP module can operate directly on the point cloud data, improving accuracy and reducing processing times. The local maps can then be analyzed to identify correspondence points. The correspondence points include a point in space that has been scanned multiple times from multiple poses. The correspondence points can be used to construct a pose graph. In some embodiments, the ICP module can identify correspondence points in the local maps using the ICP algorithm. Rather than using the approaches of computing feature points (for example the point feature histograms (PFH), fast point feature histograms (FPFH), 3D scale invariant feature transform (SIFT) feature point or other feature extraction techniques) and then estimating correspondence that are adopted by many point cloud matching techniques, embodiments use ICP to directly determine correspondence without computing human crafted features (e.g., PFH, FPFH, 3D SIFT, etc.). This also avoids potential error that is introduced during the process of abstracting feature information. Graph optimization techniques can then be used to optimize the pose graph to create the optimized point cloud data. The resulting optimized point cloud data can then be viewed on the post-processing application 130 or mapping application 128.

Figure 3:
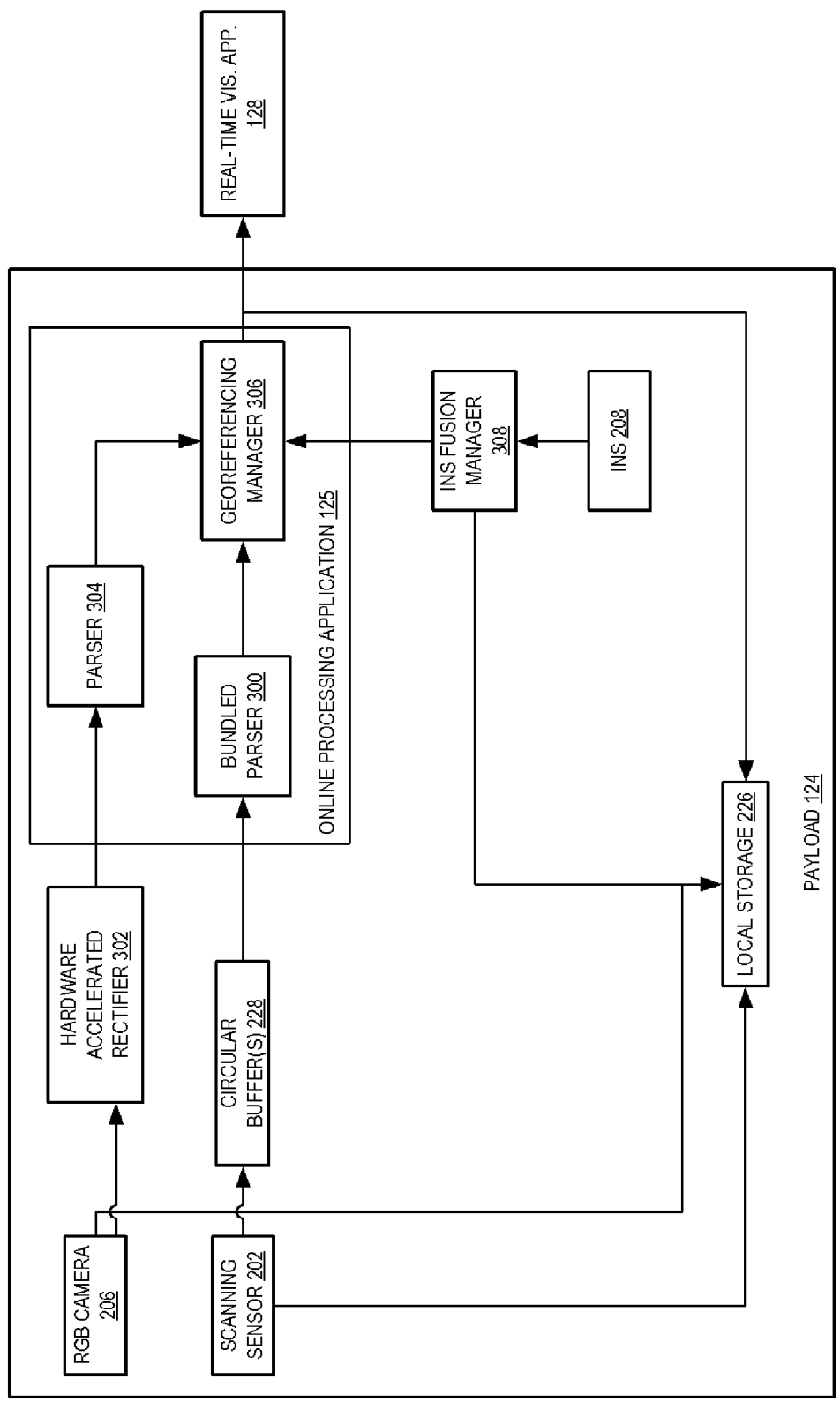
FIG. 3 illustrates an example of an online processing dataflow of LiDAR, camera, and INS data, in accordance with various embodiments.

FIG. 3 illustrates an example of an online processing dataflow of LiDAR, camera, and INS data, in accordance with various embodiments. As shown in FIG. 3, the online processing application 125 can receive data from scanning sensor 202, RGB camera 206, and INS 208. In some embodiments, the scanning sensor data can be added to one or more circular buffers 228 as it is obtained by the scanning sensor. For example, this data can include a plurality of points corresponding to scans performed by a LiDAR or other scanning sensor. Additionally, the scanning data can be added to local storage 226. For example, the local storage may include a removable storage medium, such as an SD card. The scanning data can be written to the SD card as an LAS file, a PLY file, or other file formats. In some embodiments, the scanning data can be received at 2500 HZ (e.g., 2500 points per second are received from the scanning sensor). Additionally, each point of the scanning data can be timestamped using an embedded clock circuit that is shared by the components of the embedded system. In some embodiments, the frequency of the scanning data is higher than the clock circuitry supports. In such embodiments, a plurality of points may have the same timestamp value.

In some embodiments, the circular buffer(s) 228 can be of fixed size in memory of payload 124. The online processing application 125 consumes this data via bundled parser 300. To avoid the overhead associated with separately reading each stored point, bundled parser 300 can read a plurality of points (e.g., approximately two seconds worth of points, though the size of the batch may be configured based on available computing resources) and process the plurality of points as a batch. For example, in some embodiments, the points are stored in polar coordinates in the circular buffer 228. The bundled parser 300 can convert each point in the batch of points it reads from polar coordinates to Cartesian coordinates. In some embodiments, the bundled parser 300 can further extract the time stamp data associated with the points in the batch and provide them to the georeferencing manager. In some embodiments, the bundled parser 300 can perform any other data preparation operations as needed to prepare the data for the georeferencing manager. As data is read from circular buffers 228, blocks of the buffer are marked as available and new scanning data can be added to the free blocks. If the online processing application 125 does not read the scanning data quickly enough, and the circular buffer(s) become full, then some or all of the oldest scanning data stored in the circular buffer(s) can be overwritten by new scanning data. For example, the older blocks of scanning data can have points randomly overwritten by new scanning data. This way, new scanning data is stored without overwriting all of the old scanning data. Additionally, the circular buffer ensures that the online processing application does not crash due to buffer overload.

As discussed, RGB camera 206 can capture color image data from the perspective of the payload 124. In some embodiments, images can be received at a rate of 0.5 Hz (e.g., a new image is received every other second). Additionally, the images can be timestamped using the embedded clock circuit that is shared by the components of the embedded system. The color image data can be written to local storage 226. Additionally, the color image data can be provided to hardware accelerated rectifier 302. The hardware accelerated rectifier 302 can perform image rectification on the image data. Image rectification can include projecting the images onto a common plane using an image rectification algorithm, such as planar rectification, cylindrical rectification, polar rectification, etc. The hardware accelerated rectifier 302 can calculate a transformation matrix to perform rectification and these calculations may be accelerated using the embedded processor, such as a DSP. In some embodiments, the embedded processor may include a plurality of cores, enabling these calculations to be performed in parallel across multiple cores. In some embodiments, once image rectification has been performed, the rectified image data is provided to parser 304. Parser 304 can generate a thumbnail of each image and extract the time stamp associated with each image.

In some embodiments, the INS 208 can provide positioning data, including attitude data of the payload, GPS (or other global navigation satellite service) coordinate data that has been corrected based on RTK data obtained from the movable object, etc. The sensor data can be passed to INS fusion manager 308 for further processing. The positioning data may include GPS coordinates for the movable object and, in some embodiments, may include roll, pitch, and yaw values associated with the payload corresponding to each GPS coordinate. The roll, pitch, and yaw values may be obtained from the INS which may include an IMU, as discussed, or other sensor. As discussed, the positioning data may be obtained from an RTK module, which corrects the GPS coordinates based on a correction signal received from a reference station. In some embodiments, the RTK module may produce a variance value associated with each output coordinate. The variance value may represent the accuracy of the corresponding positioning data. For example, if the movable object is performing sharp movements, the variance value may go up, indicating less accurate positioning data has been collected. The variance value may also vary depending on atmospheric conditions, leading to different accuracies measured by the movable object depending on the particular conditions present when the data was collected. The INS fusion manager 308 can combine the various INS sensor data and provide it to georeferencing manager 306. This may include using IMU data to improve the precision of the RTK data. In some embodiments, the INS fusion manager 308 can filter the positioning data to remove noise, etc. In some embodiments, the INS fusion manager 308 can also store the combined position data to local storage 226.

Georeferencing manager 306 can obtain the scanning data from the scanning sensor 202, the color image data from the RGB camera 206, and the positioning data from the INS 208 and generate a geo-referenced mapping data (e.g., geo-referenced point cloud data). In various embodiments, the scanning sensor may produce mapping data in a point cloud format. The point cloud of the mapping data may be a three-dimensional representation of the target environment. In some embodiments, the point cloud of the mapping data may be converted to a matrix representation. The output of the georeferencing manager can be stored to local storage 226. Additionally, the georeferencing manager can downsample the point cloud data and provide it to the real-time visualization application 128 on client device 110 to view the point cloud data in real time. In some embodiments, the embedded processor may further generate representation data by projecting the three-dimensional point cloud data onto a two-dimensional plane based on a selected perspective of view. The representation data indicates a preview of the three-dimensional point cloud data that may be stored to the local storage 226 or rendered on the real-time visualization app 128 as a thumbnail image.

Figure 4:
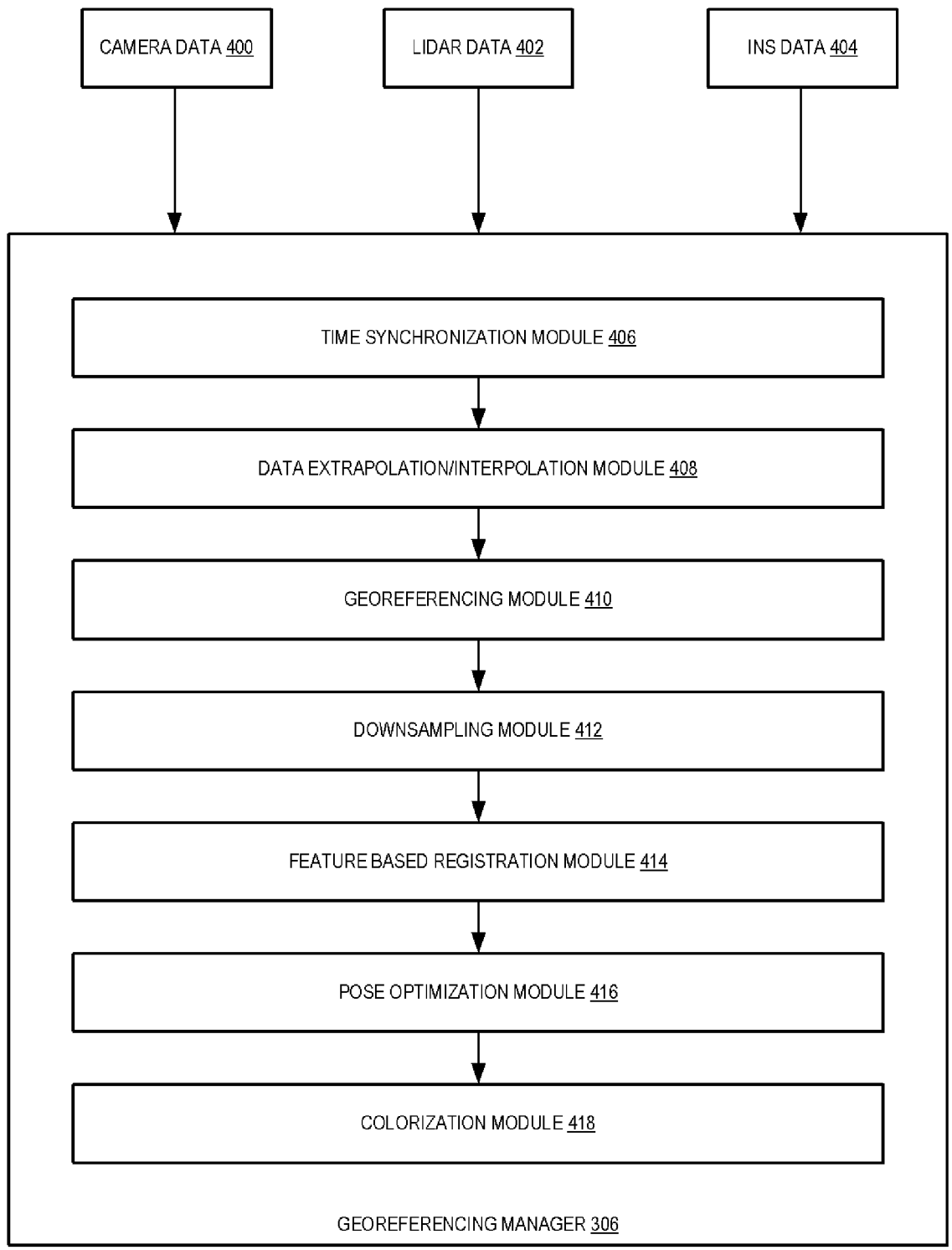
FIG. 4 illustrates an example of a georeferencing manager, in accordance with various embodiments.

FIG. 4 illustrates an example of a georeferencing manager, in accordance with various embodiments. As discussed, georeferencing manager 306 can receive camera data 400, LiDAR data 402, and INS data 404. As shown in FIG. 4, georeferencing manager 306 can include a time synchronization module 406. The scanning sensor, INS, and RGB camera can all be hardware and/or software synced using a clock circuit of the embedded system. For example, as discussed, the image data and the point data can include time stamps. The time synchronization module can use the time stamps to synchronize the sensor data from the various sensors. The timestamps can be provided by a shared reference clock signal generated by the clock circuit of the embedded system. The clock circuit is connected to the scanning sensor, INS, RGB camera, and the embedded processor on the same circuit board. In embodiments, time stamp data is generated for each of the various sensors based on the shared reference clock signal, such that simplified time synchronization is achieved. In embodiments, the time stamp data may be used for sensor data interpolation and/or extrapolation performed online, such that the frequencies of the sensor data are matched for geo-referencing and/or real-time visualization of the mapping data.

In some embodiments, the frequency of the data obtained from each sensor may be different. For example, the scanning sensor may be producing data in the range of hundreds of kHz, while the positioning sensor may be producing data in the range of hundreds of Hz. Accordingly, to ensure each point of the mapping data has corresponding positioning data, the data extrapolation/interpolation module 408 can perform interpolation and/or extrapolation on the sensor data such that the frequencies of the sensor data are matched. In embodiments, the sensor data extrapolation/interpolation is performed online before sending to a remote client device for visualization or post-processing. Since sensor data may not be available for all timestamps, data may be interpolated between timestamps (e.g., lower frequency data can be interpolated to match the higher frequency data). For example, assuming the positioning data is produced by the positioning sensor at 100 Hz and the mapping data is produced by the scanning sensor (e.g., a LiDAR sensor) at 100 kHz, the positioning data may be upsampled from 100 Hz to 100 kHz. Various upsampling techniques may be used to upsample the positioning data. For example, a linear fit algorithm, such as least squares, may be used. In some embodiments, non-linear fit algorithms may be used to upsample the positioning data. Additionally, the roll, pitch, yaw values of the positioning data may also be interpolated to match the frequency of the mapping data, as needed. In some embodiments, the roll, pitch, and yaw values may be spherical linear interpolated (SLERP) to match the number of points in the mapping data. The time stamps may likewise be interpolated to match the interpolated positioning data. Further, data is extrapolated if prediction is needed beyond available data. For example, GPS data may be received slower than the other sensor data (e.g., there may be a delay in obtaining the GPS data). Accordingly, extrapolation can be used to estimate the current GPS data when it is unavailable. For example, linear data fitting is used to fit GPS data with LiDAR data.

Once the sensor data has been time synchronized and the sensor data has been extrapolated/interpolated as needed such that every point is associated with image data and INS data, the point data can be georeferenced by georeferencing module 410. For example, as discussed, the scanning sensor may produce mapping data in a point cloud format. The point cloud of the mapping data may be a three-dimensional representation of the target environment. In some embodiments, the point cloud of the mapping data may be converted to a matrix representation. The positioning data may include GNSS coordinates for the movable object and, in some embodiments, may include roll, pitch, and yaw values associated with the payload corresponding to each GNSS coordinate. The roll, pitch, and yaw values may be obtained from the INS which may include an IMU, as discussed, or other sensor. As discussed, the positioning data may be obtained from an RTK module, which corrects the GPS coordinates based on a correction signal received from a reference station. In some embodiments, the RTK module may produce a variance value associated with each output coordinate. The variance value may represent the accuracy of the corresponding positioning data. For example, if the movable object is performing sharp movements, the variance value may go up, indicating less accurate positioning data has been collected. The variance value may also vary depending on atmospheric conditions, leading to different accuracies measured by the movable object depending on the particular conditions present when the data was collected.

Georeferencing module 410 can convert a matrix representation of the mapping data from the frame of reference (or the reference coordinate system) in which it was collected (e.g., scanner reference frame or scanner reference coordinate system) to a desired frame of reference (or a desired reference coordinate system). For example, the positioning data may be converted from the scanner reference frame to a north-east-down (NED) reference frame (or a NED coordinate system). The reference frame to which the positioning data is converted may vary depending on the application of the map that is being produced. For example, if the map is being used in surveying, it may be converted to the NED reference frame. For another example, if the map is being used for rendering motions such as flight simulation, it may be converted to the FlightGear coordinate system. Other applications of the map may effect conversions of the positioning data to different reference frames or different coordinate systems.

In some embodiments, the matrix math performed to georeference the point cloud data can be performed on the embedded processor, which may include a DSP. The DSP allows multi-threaded math to be completed in parallel. With the DSP having multiple cores, matrix multiplication of the individual elements in a Transformation Matrix is calculated and then assembled. In some embodiments, the embedded processor may include multiple processors, such as a DSP and a CPU. In such examples, the embedded DSP may be used for the matrix calculations and the results are then assembled using the embedded CPU.

Each point in the point cloud of the mapping data is associated with a position in the scanner reference frame that is determined relative to the scanning sensor. The positioning data of the movable object, produced by the positioning sensor, may then be used to convert this position in the scanner reference frame to the output reference frame in a world coordinate system, such as a GPS coordinate system. For example, the position of the scanning sensor in the world coordinate system is known based on the positioning data. In some embodiments, the positioning sensor and the scanning module may be offset (e.g., due to being located at different positions on the movable object). In such embodiments, a further correction factoring in this offset may be used to convert from the scanner reference frame to the output reference frame (e.g., each measured position in the positioning data may be corrected using the offset between the positioning sensor and the scanning sensor). For each point in the point cloud of the mapping data, the corresponding positioning data can be identified using the time stamp. The point can then be converted to the new reference frame. In some embodiments, the scanner reference frame can be converted into a horizontal reference frame using the interpolated roll, pitch, and yaw values from the positioning data. Once the mapping data has been converted into the horizontal reference frame, it may be further converted into a Cartesian frame or other output reference frame. Once each point has been converted, the result is a geo-referenced point cloud, with each point in the point cloud now referenced to the world coordinate system. In some embodiments, the geo-referenced point cloud can further be improved by performing outlier removal to remove outlier data from the geo-referenced point cloud.

The georeferenced data can then be passed to downsampling module 412. Downsampling module 412 can implement a voxel grid down-sample algorithm which divides the georeferenced point cloud data into a plurality of voxels (e.g., cubes). In various embodiments, the resolution of the voxels (e.g., the size of each voxel), may be arbitrarily defined. This allows for the downsampling to be varied by changing the size of the voxels (e.g., larger voxel size yields a greater downsampling). A given voxel may be associated with zero or more points from the georeferenced point cloud data. When a voxel includes a plurality of points, the downsampling module can average the points in the voxel, thus reducing the plurality of points to a single average point. In some embodiments, the points may be weighted by the quality of the INS data associated with the points. For example, the RTK variance can be used to determine a weight, where a larger RTK variance is associated with a lower weight and a lower RTK variance is associated with a higher weight. When the points are averaged, the points having a lower weight, and therefore are associated with lower quality position data, have less influence in determining the average position, than more accurate, higher weighted points. By downsampling the point-clouds, processing requirements are significantly reduced to be processed in real-time. This allows for the embedded processor to be a DSP rather than a full CPU or GPU for further processing of the point cloud data.

Optionally, in some embodiments, feature based registration module 414 can perform feature-based registration. In some embodiments, feature based registration can use iterative closest point (ICP) algorithms. In some embodiments, the feature-based registration module can perform ICP directly on the point cloud data to generate local maps, improving accuracy and reducing processing times. The local maps can then be analyzed to identify correspondence points. The correspondence points include a point in space that has been scanned multiple times from multiple poses. The correspondence points can be used to construct a pose graph. In some embodiments, the feature-based registration module 414 can identify correspondence points in the local maps using the ICP algorithm. Rather than using the approaches of computing feature points (for example the point feature histograms (PFH), fast point feature histograms (FPFH), 3D scale invariant feature transform (SIFT) feature point or other feature extraction techniques) and then estimating correspondence that are adopted by many point cloud matching techniques, embodiments use ICP to directly determine correspondence without computing human crafted features (e.g., PFH, FPFH, 3D SIFT, etc.). This also avoids potential error that is introduced during the process of abstracting feature information.

After corresponding points between local maps are computed, pose optimization module 416 can perform graph optimization on the local maps. For example, each pair of correspondence points forms a constrain in Graph Optimization. Graph optimization techniques can then be used to optimize the pose graph to create the optimized point cloud data with improved accuracy and reduced noise. In some embodiments, georeferencing manager 306 can further perform bundle adjustment on the point cloud data to minimize the re-projection error between poses using non-linear least squares algorithm.

After the geo-referenced point cloud has been produced, the geo-referenced point cloud data can be colorized by colorization module 418. For example, the colorization module 418 can obtain color information from the image data collected by RGB camera 206. The color data can be applied to each point in the point cloud based on image data that was captured at the same time as the scanning data based on the shared clock signal. By colorizing the point cloud data, the 3D environment can be better visualized. Additionally, or alternatively, colorization module 418 can colorize the point cloud data based on other information, such as intensity, height above a reference plane, etc.

In some embodiments, the techniques used for online processing have been simplified as compared to the techniques used for post-processing. For example, post-processing uses an Octomap-based downsampling technique which is a compute-heavy technique that requires more resources than are available on the payload. Instead, in online processing, voxel grid downsampling is used as discussed. Pose graph optimization is performed in post-processing using a complex solver, such as the G2O solver, whereas simplified pose graph optimizations are used in online processing.

Figure 5:
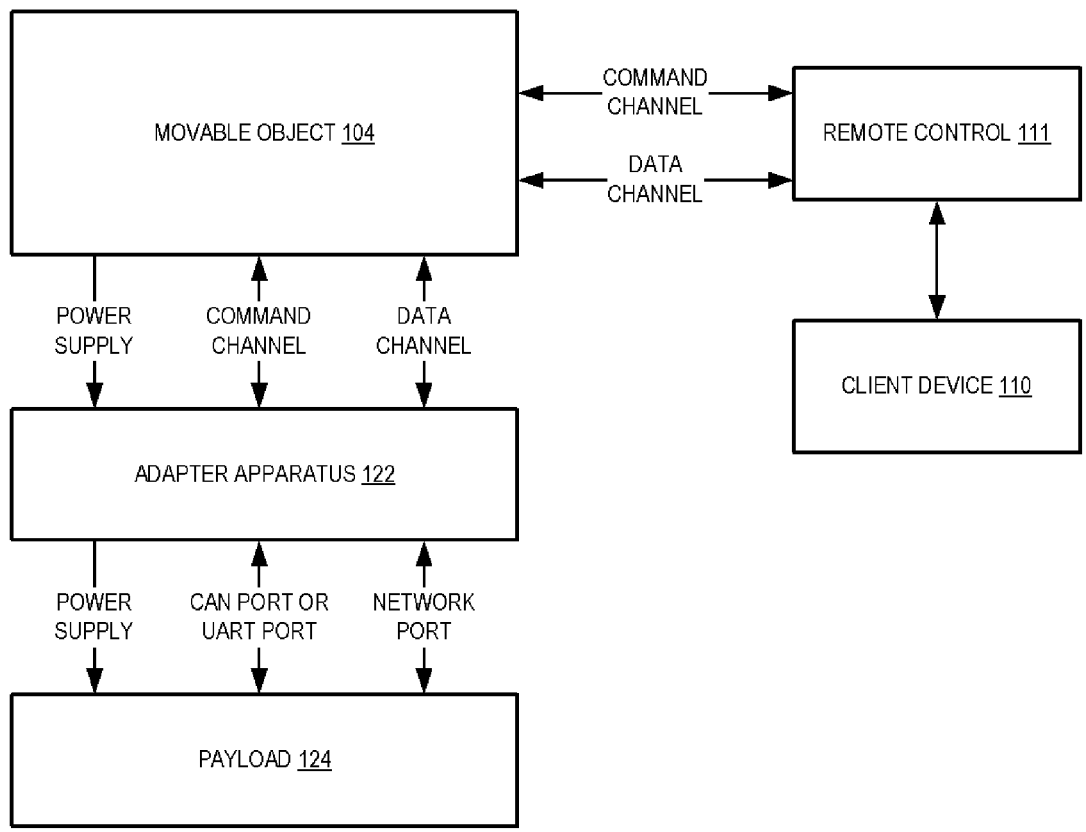
FIG. 5 illustrates an example of an adapter apparatus in a movable object environment, in accordance with various embodiments.

FIG. 5 illustrates an example of an adapter apparatus in a movable object environment, in accordance with various embodiments. As shown in FIG. 5, an adapter apparatus 122 enables a payload 124 to be connected to a movable object 104. In some embodiments, the adapter apparatus 122 is a Payload Software Development Kit (SDK) adapter plate, an adapter ring, and the like. The payload 124 can be connected to the adapter apparatus 122, and the adapter apparatus 122 can be coupled with the fuselage of the movable object 104. In some embodiments, adapter apparatus 122 may include a quick release connector to which the payload 124 can be attached/detached.

When the payload 124 is connected to the movable object 104 through the adapter apparatus 122, the payload 124 can also be controlled by a client device 110 via a remote control 111. As shown in FIG. 5, the remote control 111 can send a control instruction through a command channel between the remote control 111 and the communication system of the movable object 104. The control instruction can be transmitted to control the movable object 104 and/or the payload 124. For example, the control instruction may be used for controlling the attitude of the payload, to selectively view live data being collected by the payload (e.g., real-time low density mapping data, image data, etc.) on the client device, etc.

As shown in FIG. 5, after the communication system of the movable object 104 receives the control instruction, the control instruction is sent to the adapter apparatus 122, the communication protocol between the communication system and the adapter apparatus 122 of the movable object may be referred to as an internal protocol, and the communication protocol between the adapter apparatus 122 and the payload 124 may be referred to as an external protocol. In an embodiment, an internal protocol between the communication system of the movable object 104 and the adapter apparatus 122 is recorded as a first communication protocol, and an external protocol between the adapter apparatus 122 and the payload 124 is recorded as a second communication protocol. After the communication system of the movable object receives the control instruction, a first communication protocol is adopted to send the control instruction to the adapter apparatus 122 through a command channel between the communication system and the adapter apparatus 122.

When the adapter apparatus 122 receives the control instruction sent by the movable object 104 using the first communication protocol, the internal protocol between the communication system of the movable object 104 and the adapter apparatus 122 is converted into an external protocol between the adapter apparatus 122 and the payload 124. In some embodiments, the internal protocol can be converted into the external protocol by the adapter apparatus 122 by adding a header conforming to the external protocol in the outer layer of the internal protocol message, so that the internal protocol message is converted into an external protocol message.

As shown in FIG. 5, the communication interface between the adapter apparatus 122 and the payload 124 may include a Controller Area Network (CAN) interface or a Universal Asynchronous Receiver/Transmitter (UART) interface. After the adapter apparatus 122 converts the internal protocol between the communication system of the movable object 104 and the adapter apparatus 122 into an external protocol between the adapter apparatus 122 and the payload 124, the control instruction is sent to the payload 124 through the CAN interface or the UART interface by using an external protocol.

As discussed, the payload 124 can collect sensor data from a plurality of sensors incorporated into the payload 124, such as a LiDAR sensor, one or more cameras, an INS, etc. The payload 124 can send sensor data to the adapter apparatus 122 through a network port between the payload 124 and the adapter apparatus 122. Alternatively, the payload 124 may also send sensor data through a CAN interface or a UART interface between the payload 124 and the adapter apparatus 122. Optionally, the payload 124 sends the sensor data to the adapter apparatus 122 through the network port, the CAN interface or the UART interface using a second communication protocol, e.g., the external protocol.

After the adapter apparatus 122 receives the sensor data from the payload 124, the adapter apparatus 122 converts the external protocol between the adapter apparatus 122 and the payload 124 into an internal protocol between the communication system of the movable object 104 and the adapter apparatus 122. In some embodiments, the adapter apparatus 122 uses an internal protocol to send sensor data to a communication system of the movable object 104 through a data channel between the adapter apparatus 122 and the movable object 104. Further, the communication system sends the sensor data to the remote control 111 through the data channel between the movable object and the remote control 111, and the remote control 111 forwards the sensor data to the client device 110.

After the adapter apparatus 122 receives the sensor data sent by the payload 124, the sensor data can be encrypted to obtain encrypted data. Further, the adapter apparatus 122 uses the internal protocol to send the encrypted data to the communication system of the movable object through the data channel between the adapter apparatus 122 and the movable object 104, the communication system sends the encrypted data to the remote control 111 through the data channel between the movable object 104 and the remote control 111, and the remote control 111 forwards the encrypted data to the client device 110.

In some embodiments, the payload 124 can be mounted on the movable object 104 through the adapter apparatus 122. When the adapter apparatus receives the control instruction for controlling the payload 124 sent by the movable object 104, the internal protocol between the movable object 104 and the adapter apparatus 122 is converted into an external protocol between the adapter apparatus and the payload 124, and the control instruction is sent to the payload 124 by adopting an external protocol, so that the third-party device produced by the third-party manufacturer can communicate with the movable object normally through the external protocol, so that the movable object can support the third-party device, and the application range of the movable object is improved.

In some embodiments, to facilitate communication with the payload, the adapter apparatus 122 sends a handshake instruction to the payload 124, and the handshake instruction is used for detecting whether the adapter apparatus and the payload 124 are in normal communication connection or not. In some embodiments, the adapter apparatus 122 can also send a handshake instruction to the payload 124 periodically or at arbitrary times. If the payload 124 does not answer, or the response message of the payload 124 is wrong, the adapter apparatus 122 can disconnect the communication connection with the payload 124, or the adapter apparatus 122 can limit the functions available to the payload 124.

The adapter apparatus 122 may also comprise a power interface, and the power interface is used for supplying power to the payload 124. As shown in FIG. 5, the movable object 104 can supply power to the adapter apparatus 122, the adapter apparatus 122 can further supply power to the payload 124, the adapter apparatus 122 may include a power interface through which the adapter apparatus 122 supplies power to the payload 124. In various embodiments, the communication interface between the movable object 104 and the adapter apparatus 122 may include a Universal Serial Bus (USB) interface.

As shown in FIG. 5, the data channel between the communication system of the movable object 104 and the adapter apparatus 122 can be implemented using a USB interface. In some embodiments, the adapter apparatus 122 can convert the USB interface into a network port, such as an Ethernet port. The payload 124 can carry out data transmission with the adapter apparatus 122 through the network port, so that the payload 124 can conveniently use the transmission control protocol to communicate with the adapter apparatus 122 for network communication without requiring a USB driver.

In some embodiments, the interface externally output by the movable object comprises a CAN port, a USB port and a 12V 5 A power supply port. The CAN interface, the USB port and the 12V 5 A power port are respectively connected with the adapter apparatus 122, the CAN port, the USB port and the 12V 5 A power port are subjected to protocol conversion by the adapter apparatus, and a pair of external interfaces can be generated.

Figure 6B:
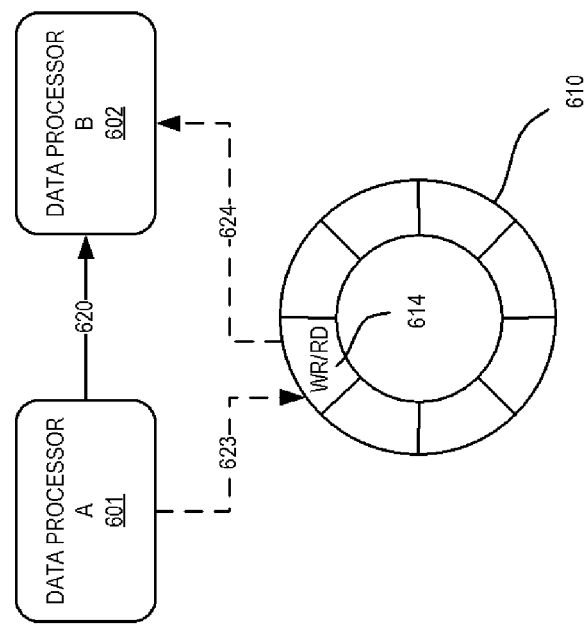
FIGS. 6A and 6B illustrate data processing based on a circular buffer in a data processing system, in accordance with various embodiments.
Figure 6A:
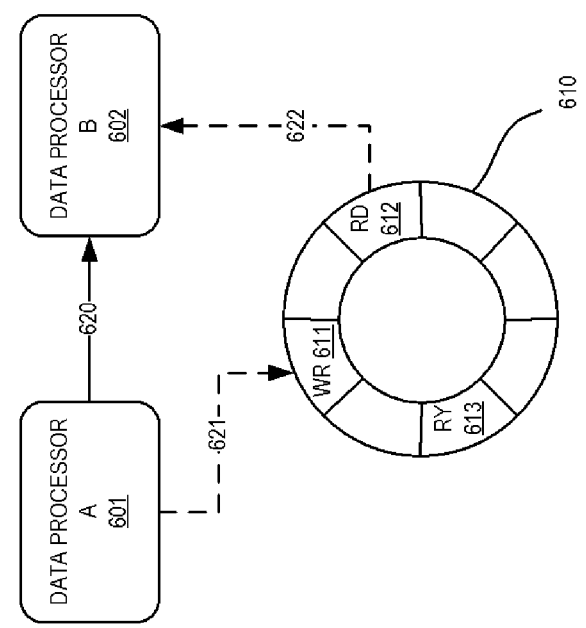

FIGS. 6A and 6B illustrate data processing based on a circular buffer in a data processing system, in accordance with various embodiments. As discussed, mapping data obtained by payload 124 can be stored in circular buffer(s) 610. As shown in FIG. 6A, an upstream module, e.g. a data processor A 601, and a downstream module, e.g. a data processor B 602, can take advantage of a circular buffer 610 for exchanging data. In embodiments, the upstream data processor A 601 and the downstream data processor B 602 may be the same processor in the embedded system, e.g., the embedded processor, or different processors in the embedded system. In accordance with various embodiments, the circular buffer 610, which may comprise a plurality of buffer blocks is advantageous to buffering data streams, e.g. data blocks of point cloud data, due to its circular topological data structure.

In accordance with various embodiments, a circular buffer management mechanism can be used for maintaining the circular buffer 610. For example, the data processor A 601 can write 621 a data block of mapping data into a buffer block 611, which may be referred to as a write block (WR). Also, the data processor B 602 can read 622 a data block of mapping data out from a buffer block 612, which may be referred to as a read block (RD). Additionally, the circular buffer 610 may comprise one or more ready blocks (RYs) stored in one or more buffer blocks. A ready block 613 is written by an upstream module, e.g. the data processor A 601, in a buffer block and has not yet been processed by the downstream module, e.g. the data processor B 602. There can be multiple ready blocks in the circular buffer 610, when the data processor B 602 is lagging behind the data processor A 601 in processing data in the circular buffer 610.

In accordance with various embodiments, the system may reach the optimal state with minimum delay when the downstream module can keep up with the progress of the upstream module. For example, FIG. 6B illustrates data processing with low latency based on a circular buffer in a data processing system, in accordance with various embodiments. As shown in FIG. 6B, the buffer block 614 in the circular buffer 610 includes a data block, which acts as both the write block for the data processor A 601 and the read block for the data processor B 602. Both the data processor A 601 and the data processor B 602 may be accessing on the same buffer block 614 simultaneously. For example, the data processor A 601 may be writing 623 data of a data block in the buffer block 614 while the data processor B 602 is reading 624 data out from the buffer block 614.

As shown in FIGS. 6A and 6B, in circumstances where the data processors A 601 and the data processors B 502 are different processors, the data processor A 601 can provide the fine granular control information 620 to the data processor B 602, so that the data processor B 602 can keep up with the progress of the data processor A 601. As a result, there may be no ready block in the circular buffer 610 (i.e. the number of ready blocks in the circular buffer 610 is zero).

In various embodiments, storage controller 216 can write point data to the circular buffers sequentially to empty blocks. If the buffer blocks of the circular buffer are filled, then old data is overwritten by new data. However, unlike conventional systems where the oldest points are overwritten by the newest points, in some embodiments, old points are randomly selected to be overwritten by new points.

Figure 7:
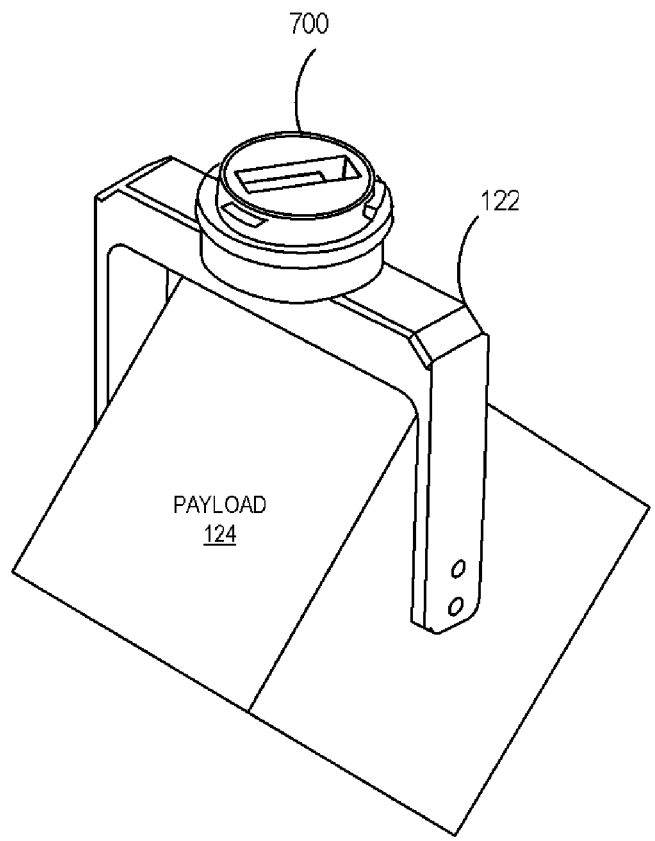
FIG. 7 illustrates an example of a payload, in accordance with various embodiments.

FIG. 7 illustrates an example of a payload, in accordance with various embodiments. As shown in FIG. 7, a payload 124 can be coupled to a movable object via an adapter apparatus 122. The adapter apparatus can include a quick release connector 700 that enables a mechanical connection to be formed with a corresponding quick release connector on the movable object. The quick release connection both physically supports the payload and adapter apparatus by connecting it to the movable object as well as providing power and data communication, as discussed above. In various embodiments, a movable object may be used for performing mapping of various application environments using the payload 124. This can include construction site mapping, surveying, target object mapping, etc. In some embodiments, the movable object may be an unmanned aerial vehicle (UAV), which has been configured to perform mapping using the payload. FIG. 7 shows an isometric view of the payload 124 and adapter apparatus 122, in accordance with an embodiment. In various embodiments, commands received by the flight controller from a client device can cause the adapter apparatus 122 to change the angle of the payload 124 as shown below with respect to FIGS. 8-10. The payload may include a gimbal which is used to stabilize the payload in flight and as it changes positions.

Figure 8:
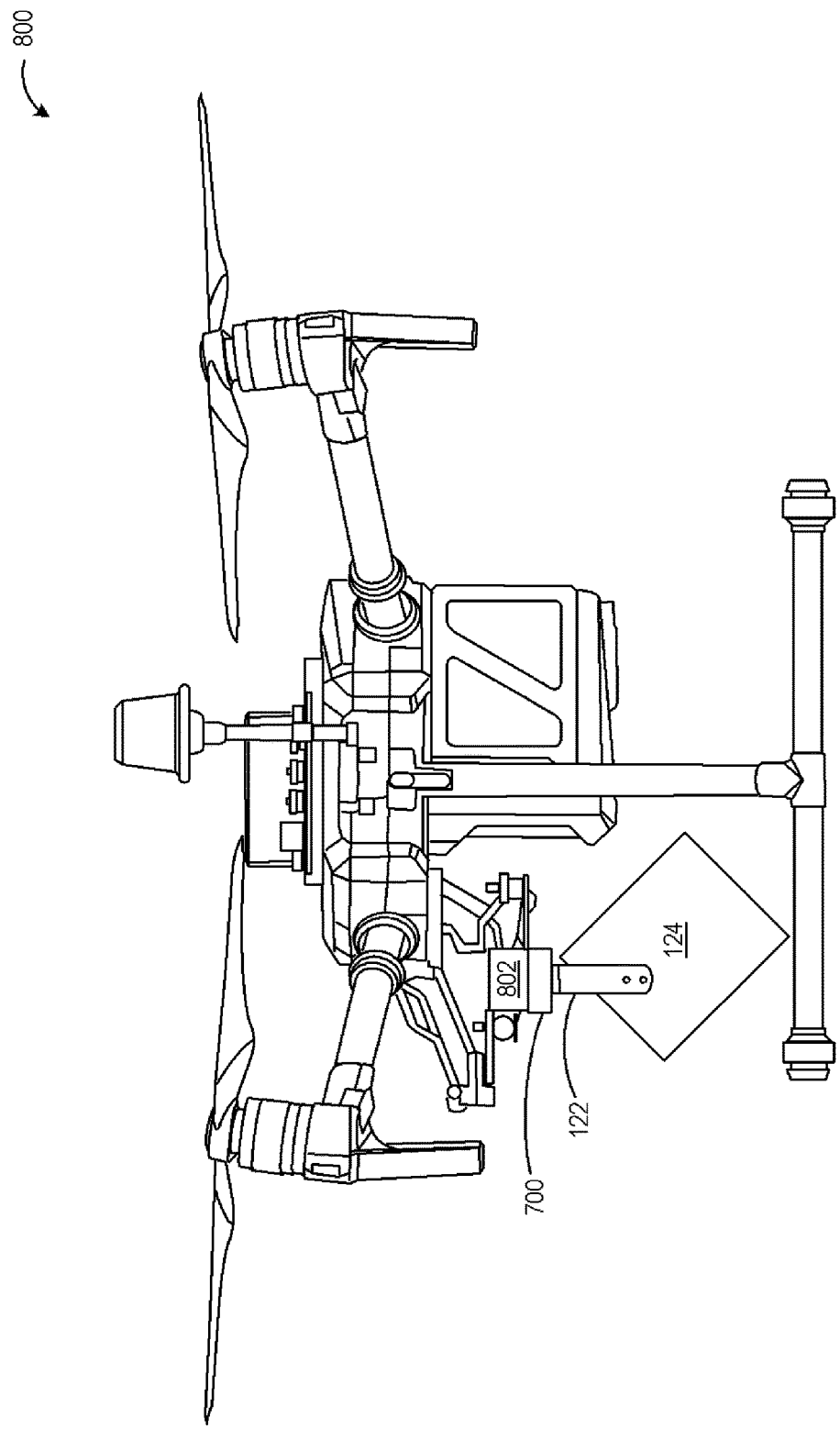
FIGS. 8-10 illustrate an example of a payload mounted to a movable object, in accordance with various embodiments.
Figure 9:
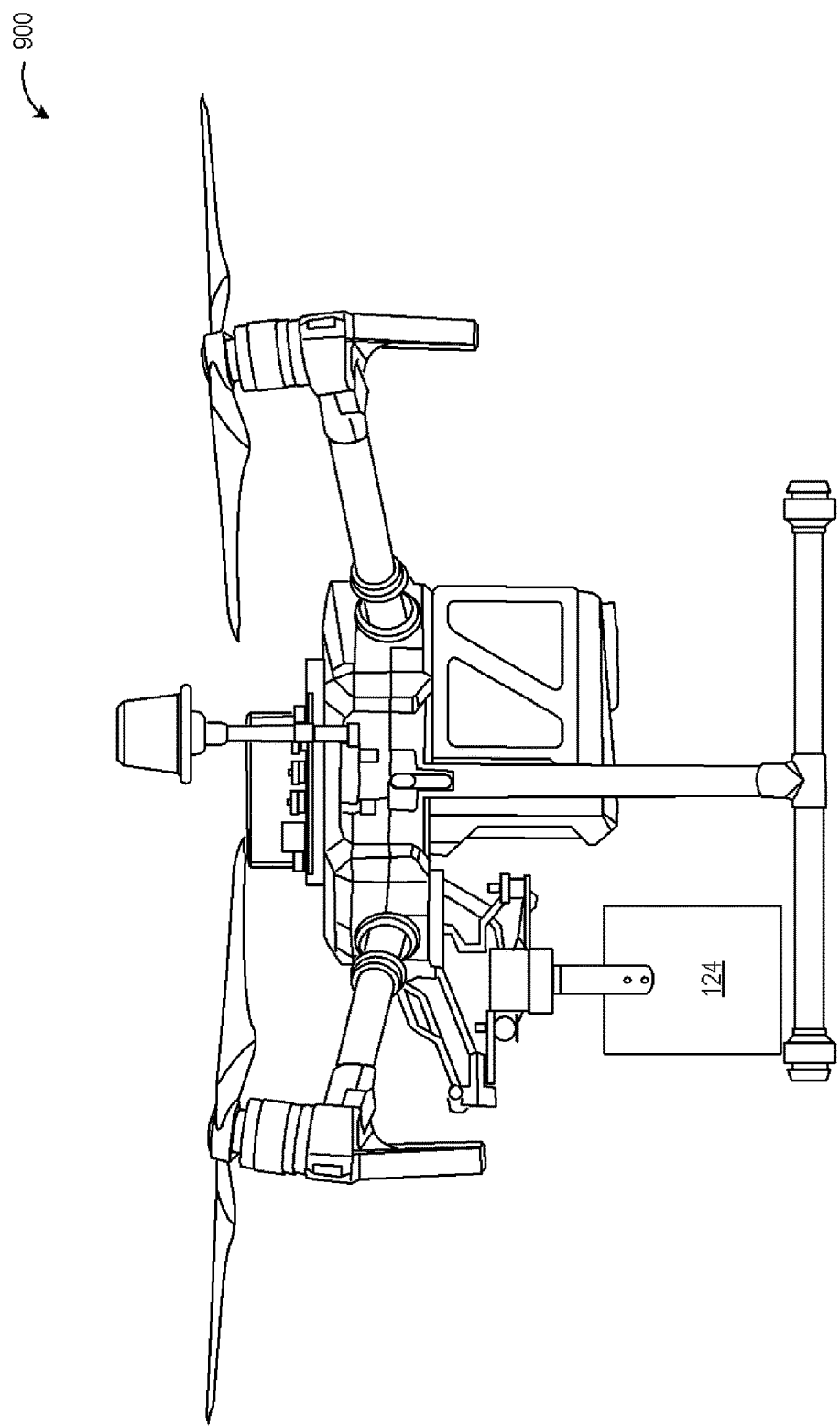
Figure 10:
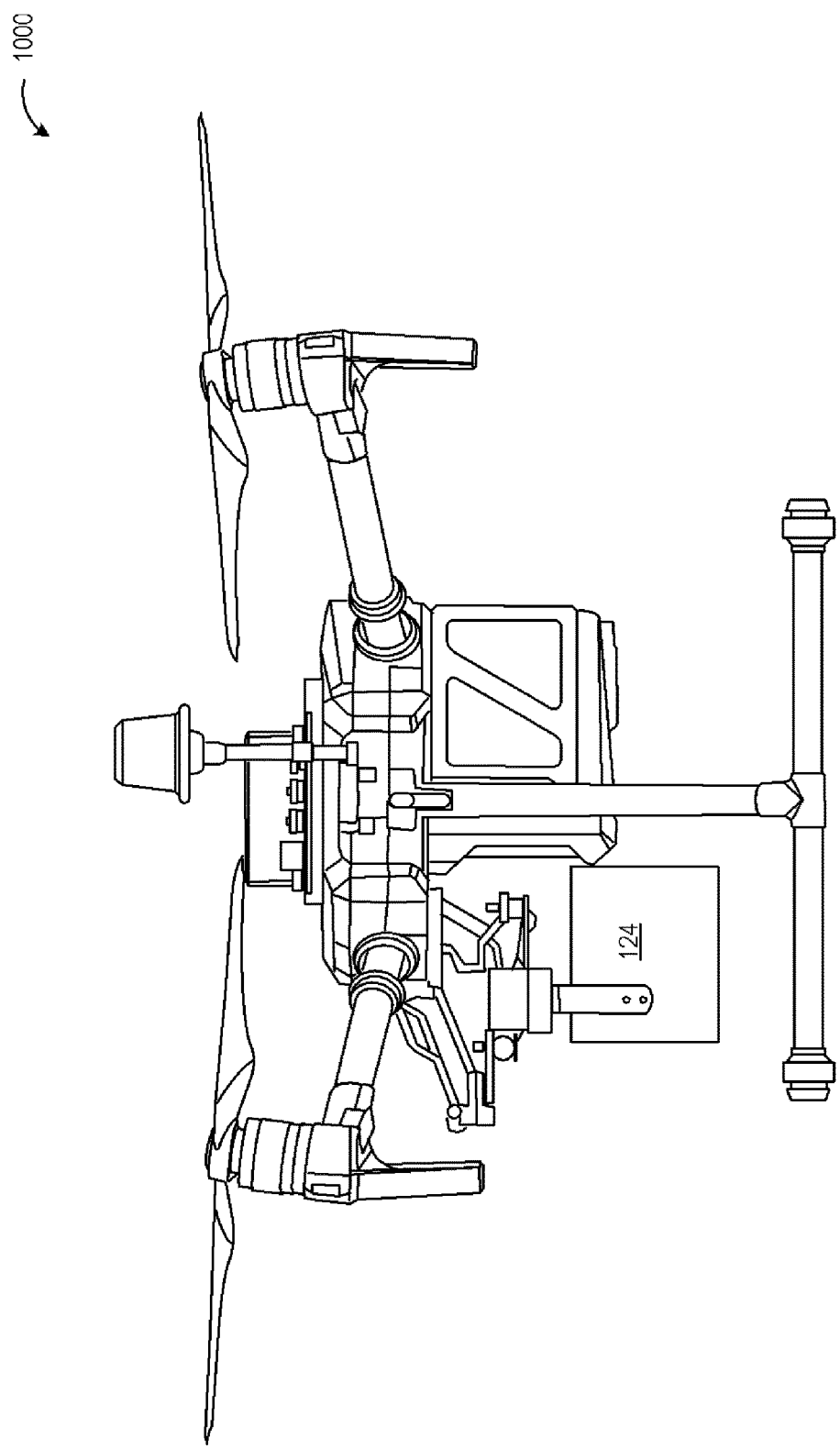

FIGS. 8-10 illustrate an example of a payload mounted to a movable object, in accordance with various embodiments. In the example 800 shown in FIG. 8, the payload 124 can be positioned at 45 degrees relative to horizontal. This position can be achieved using a pivot bracket incorporated into the adapter apparatus 122. In some embodiments, the payload position can be set manually by a user prior to starting a mission or may be controlled remotely by sending commands to the UAV from a client device. As shown, the quick release connector 700 of the adapter apparatus can be mounted to a corresponding quick release connector 802 mounted to the UAV. As discussed, this connection provides physical support to the payload as well as power and data communication. In the example 900 shown in FIG. 9, the payload 124 can be positioned at 0 degrees relative to horizontal. Similarly, the example 1000 shown in FIG. 10 shows the payload 124 positioned at 90 degrees relative to horizontal. These positions can be achieved using a pivot bracket incorporated into the adapter apparatus 122, either manually or in response to a command from the client device.

Figure 11:
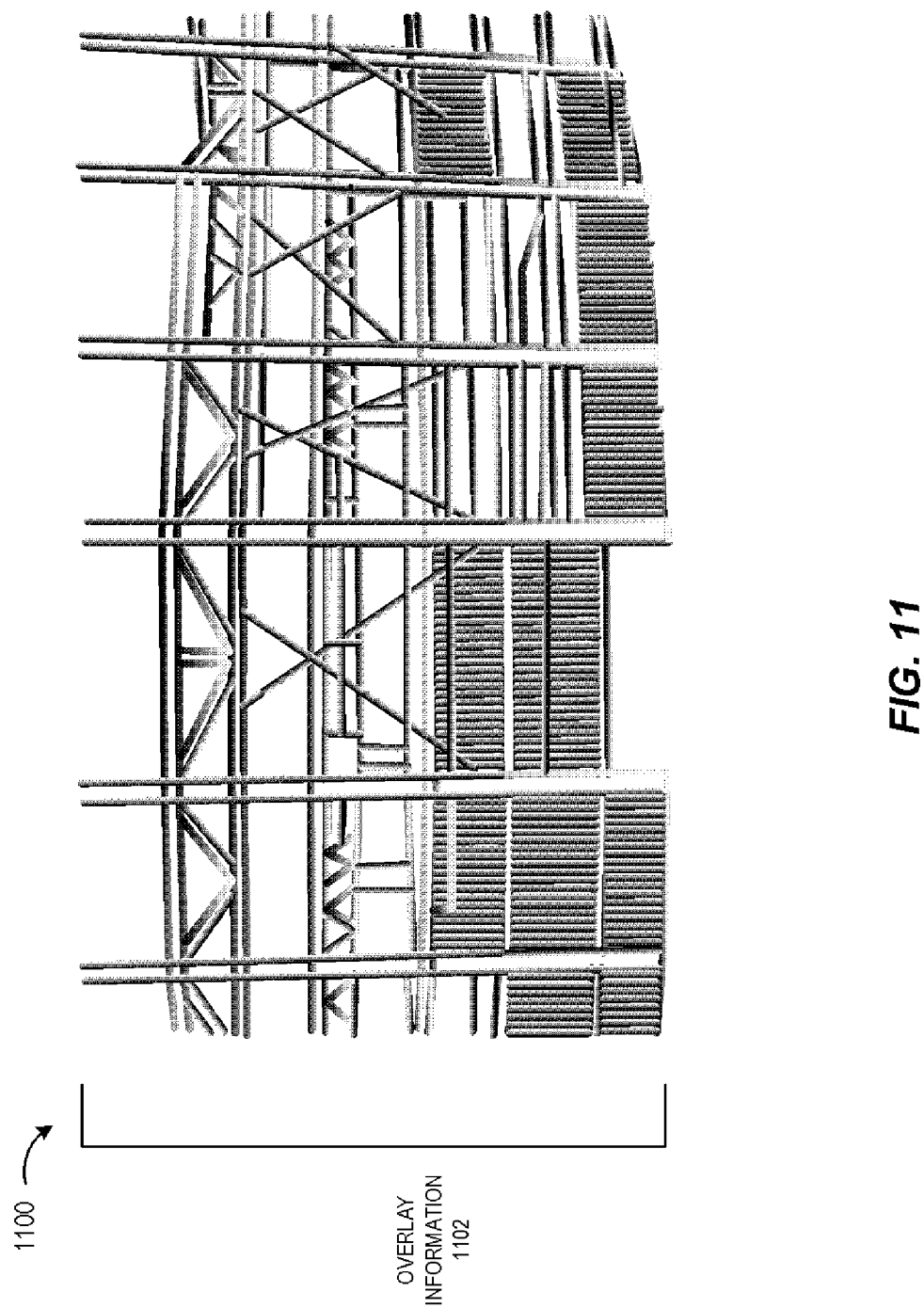
FIG. 11 illustrates an example of overlaying information in mapping data, in accordance with various embodiments.

FIG. 11 illustrates an example 1100 of overlaying data values in mapping data, in accordance with various embodiments. As shown in FIG. 11, overlay information 1102 can be obtained from the RGB camera or other sensors incorporated into the payload. For example, in some embodiments, the overlay information can include color data which may include pixel values of various color schemes (e.g., 16-bit, 32-bit, etc.). The color data can be extracted from one or more images captured by the RGB camera at the same time as the point cloud data was captured by the scanning sensor and these color values can be overlaid on the visualization of the point cloud data. Although depicted in FIG. 11 as grayscale, the color data may include various color values depending on the color values of the image data captured by the RGB camera. In some embodiments, the overlay data can include height above a reference plane. For example, a color value may be assigned to points depending on their height above the reference plane. The height values may be relative height values, relative to the reference plane, or absolute height values (e.g., relative to sea level). The reference plane may correspond to the ground, floor, or an arbitrary plane selected by the user. The values may vary monochromatically as the height changes or may change colors as the height changes. In some embodiments, the overlay information can represent intensity values. The intensity values may correspond to a return strength of the laser beam as received by the LiDAR sensor. The intensity values may indicate material composition or characteristics of objects in the target environment. For example, based on the reflectivity of the material, characteristics of the material can be inferred (e.g., type of material, such as metal, wood, concrete, etc.) and the overlay information may indicate these characteristics through different color values assigned to the different characteristics. Additionally, or alternatively, in some embodiments, the point cloud data can be overlaid on a map of the target area being scanned. For example, the point cloud data can be overlaid on a two dimensional or three-dimensional map provided by a mapping service.

Figure 12:
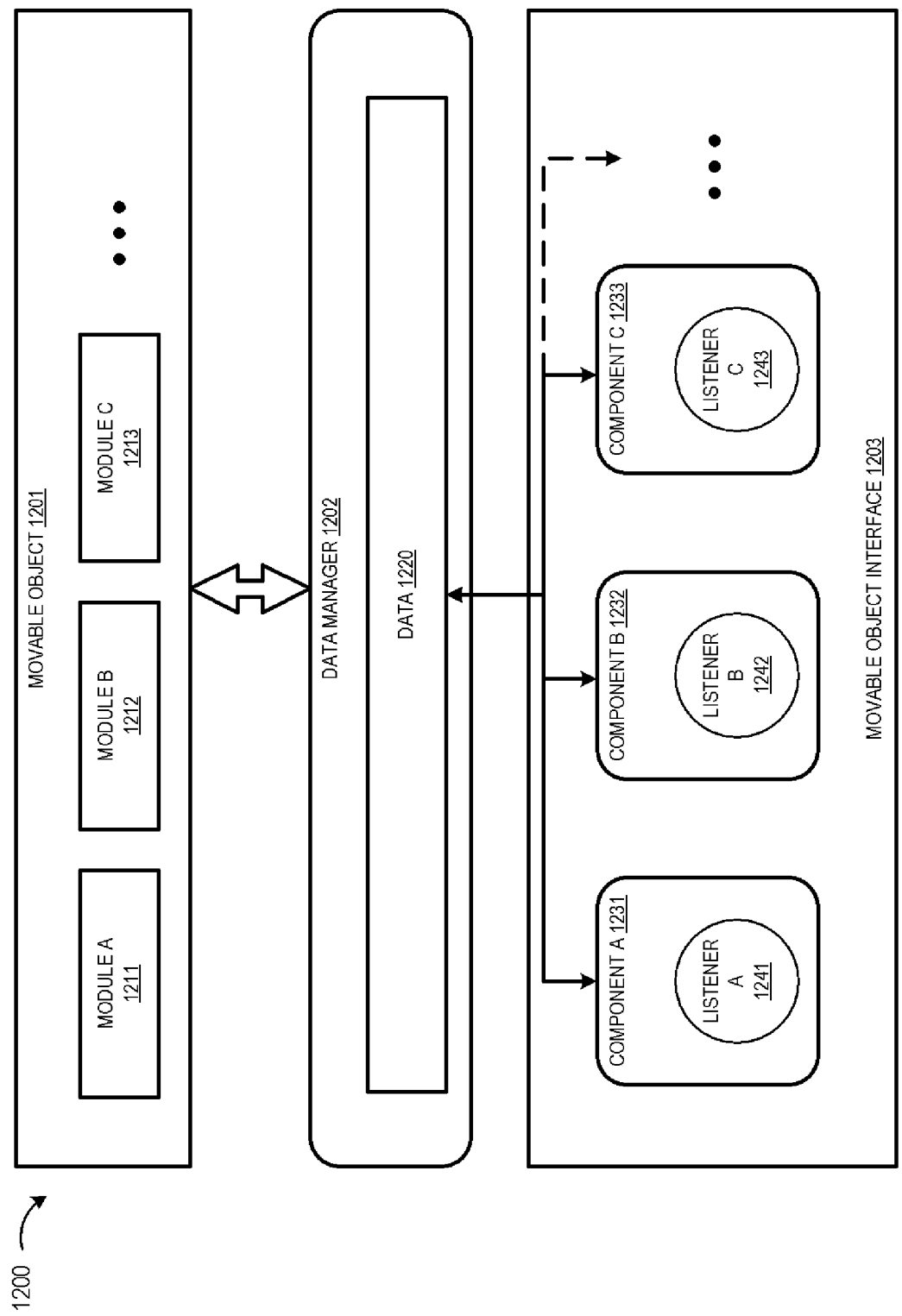
FIG. 12 illustrates an example of supporting a movable object interface in a software development environment, in accordance with various embodiments.

FIG. 12 illustrates an example of supporting a movable object interface in a software development environment, in accordance with various embodiments. As shown in FIG. 12, a movable object interface 1203 can be used for providing access to a movable object 1201 in a software development environment 1200, such as a software development kit (SDK) environment. As used herein, the SDK can be an onboard SDK implemented on an onboard environment that is coupled to the movable object 1201. The SDK can also be a mobile SDK implemented on an off-board environment that is coupled to a client device or a mobile device. Furthermore, the movable object 1201 can include various functional modules A-C 1211-1213, and the movable object interface 1203 can include different interfacing components A-C 1231-1233. Each said interfacing component A-C 1231-1233 in the movable object interface 1203 corresponds to a module A-C 1211-1213 in the movable object 1201. In some embodiments, the interfacing components may be rendered on a user interface of a display of a client device or other computing device in communication with the movable object. In such an example, the interfacing components, as rendered, may include selectable command buttons for receiving user input/instructions to control corresponding functional modules of the movable object.

In accordance with various embodiments, the movable object interface 1203 can provide one or more callback functions for supporting a distributed computing model between the application and movable object 1201.

The callback functions can be used by an application for confirming whether the movable object 1201 has received the commands. Also, the callback functions can be used by an application for receiving the execution results. Thus, the application and the movable object 1201 can interact even though they are separated in space and in logic.

As shown in FIG. 12, the interfacing components A-C 1231-1233 can be associated with the listeners A-C 1241-1243. A listener A-C 1241-1243 can inform an interfacing component A-C 1231-1233 to use a corresponding callback function to receive information from the related module(s).

Additionally, a data manager 1202, which prepares data 1220 for the movable object interface 1203, can decouple and package the related functionalities of the movable object 1201. The data manager 1202 may be onboard, that is coupled to or located on the movable object 1201, which prepares the data 1220 to be communicated to the movable object interface 1203 via communication between the movable object 1201 and a client device or a mobile device. The data manager 1202 may be off board, that is coupled to or located on a client device or a mobile device, which prepares data 1220 for the movable object interface 1203 via communication within the client device or the mobile device. Also, the data manager 1202 can be used for managing the data exchange between the applications and the movable object 1201. Thus, the application developer does not need to be involved in the complex data exchanging process.

For example, the onboard or mobile SDK can provide a series of callback functions for communicating instant messages and for receiving the execution results from a movable object. The onboard or mobile SDK can configure the life cycle for the callback functions in order to make sure that the information interchange is stable and completed. For example, the onboard or mobile SDK can establish connection between a movable object and an application on a smart phone (e.g. using an Android system or an iOS system). Following the life cycle of a smart phone system, the callback functions, such as the ones receiving information from the movable object, can take advantage of the patterns in the smart phone system and update the statements accordingly to the different stages in the life cycle of the smart phone system.

Figure 13:
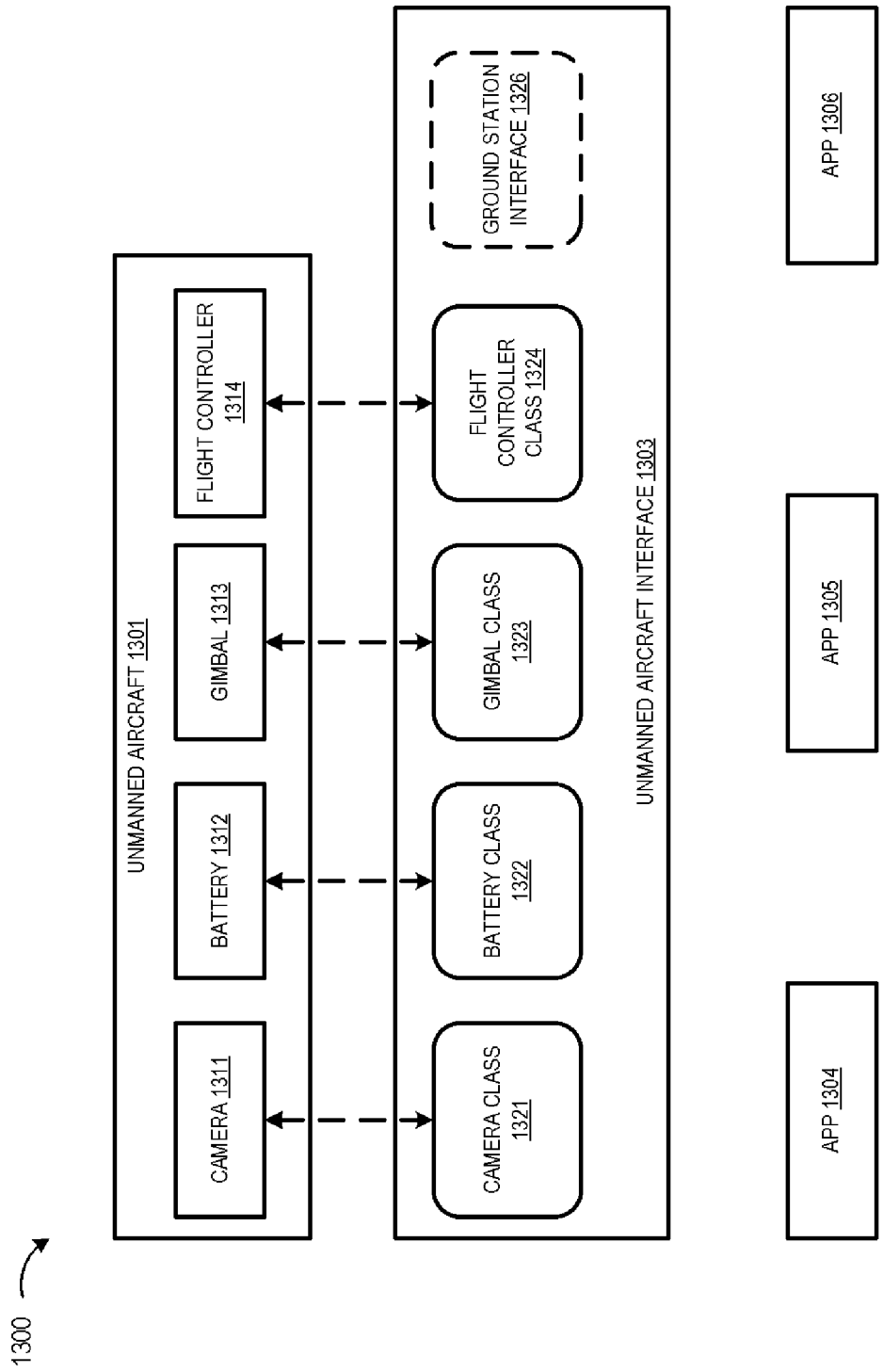
FIG. 13 illustrates an example of a movable object interface, in accordance with various embodiments.

FIG. 13 illustrates an example of a movable object interface, in accordance with various embodiments. As shown in FIG. 13, a movable object interface 1303 can be rendered on a display of a client device or other computing devices representing statuses of different components of a movable object 1301. Thus, the applications, e.g., APPs 1304-1306, in the movable object environment 1300 can access and control the movable object 1301 via the movable object interface 1303.

For example, the movable object 1301 can include various modules, such as a camera 1311, a battery 1312, a gimbal 1313, and a flight controller 1314.

Correspondently, the movable object interface 1303 can include a camera component 1321, a battery component 1322, a gimbal component 1323, and a flight controller component 1324 to be rendered on a computing device or other computing devices to receive user input/instructions by way of using the APPs 1304-1306.

Additionally, the movable object interface 1303 can include a ground station component 1326, which is associated with the flight controller component 1324. The ground station component operates to perform one or more flight control operations, which may require a high-level privilege.

Figure 14:
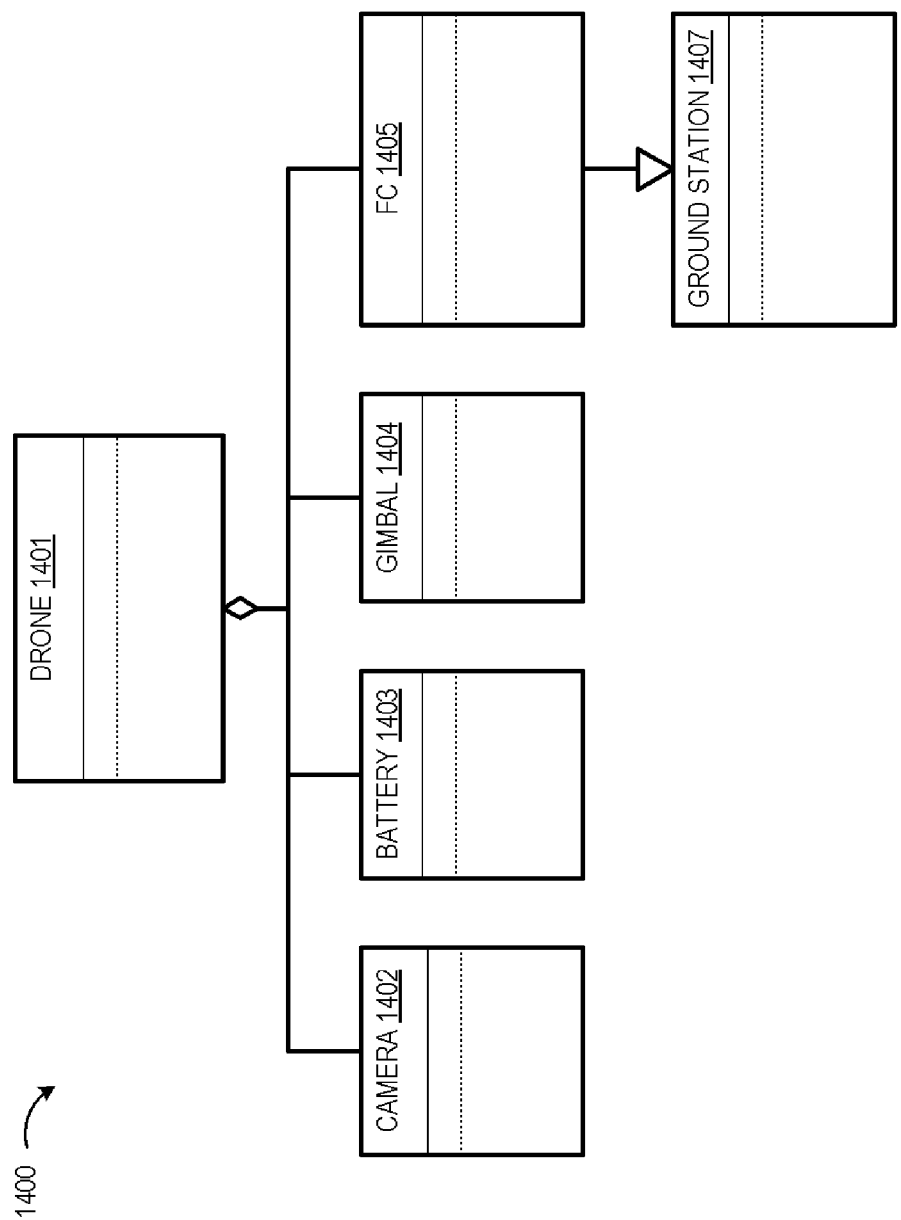
FIG. 14 illustrates an example of components for a movable object in a software development kit (SDK), in accordance with various embodiments.

FIG. 14 illustrates an example of components for a movable object in a software development kit (SDK), in accordance with various embodiments. As shown in FIG. 14, the drone class 1401 in the SDK 1400 is an aggregation of other components 1402-1407 for a movable object (e.g., a drone). The drone class 1401, which have access to the other components 1402-1407, can exchange information with the other components 1402-1407 and controls the other components 1402-1407.

In accordance with various embodiments, an application may be accessible to only one instance of the drone class 1401. Alternatively, multiple instances of the drone class 1401 can present in an application.

In the SDK, an application can connect to the instance of the drone class 1401 in order to upload the controlling commands to the movable object. For example, the SDK may include a function for establishing the connection to the movable object. Also, the SDK can disconnect the connection to the movable object using an end connection function. After connecting to the movable object, the developer can have access to the other classes (e.g. the camera class 1402, the battery class 1403, the gimbal class 1404, and the flight controller class 1405). Then, the drone class 1401 can be used for invoking the specific functions, e.g. providing access data which can be used by the flight controller to control the behavior, and/or limit the movement, of the movable object.

In accordance with various embodiments, an application can use a battery class 1403 for controlling the power source of a movable object. Also, the application can use the battery class 1403 for planning and testing the schedule for various flight tasks. As battery is one of the most restricted elements in a movable object, the application may seriously consider the status of battery not only for the safety of the movable object but also for making sure that the movable object can finish the designated tasks. For example, the battery class 1403 can be configured such that if the battery level is low, the movable object can terminate the tasks and go home outright. For example, if the movable object is determined to have a battery level that is below a threshold level, the battery class may cause the movable object to enter a power savings mode. In power savings mode, the battery class may shut off, or reduce, power available to various components that are not integral to safely returning the movable object to its home. For example, cameras that are not used for navigation and other accessories may lose power, to increase the amount of power available to the flight controller, motors, navigation system, and any other systems needed to return the movable object home, make a safe landing, etc.

Using the SDK, the application can obtain the current status and information of the battery by invoking a function to request information from in the Drone Battery Class. In some embodiments, the SDK can include a function for controlling the frequency of such feedback.

In accordance with various embodiments, an application can use a camera class 1402 for defining various operations on the camera in a movable object, such as an unmanned aircraft. For example, in SDK, the Camera Class includes functions for receiving media data in SD card, getting & setting photo parameters, taking photo and recording videos.

An application can use the camera class 1402 for modifying the setting of photos and records. For example, the SDK may include a function that enables the developer to adjust the size of photos taken. Also, an application can use a media class for maintaining the photos and records.

In accordance with various embodiments, an application can use a gimbal class 1404 for controlling the view of the movable object. For example, the Gimbal Class can be used for configuring an actual view, e.g. setting a first personal view of the movable object. Also, the Gimbal Class can be used for automatically stabilizing the gimbal, in order to be focused on one direction. Also, the application can use the Gimbal Class to change the angle of view for detecting different objects.

In accordance with various embodiments, an application can use a flight controller class 1405 for providing various flight control information and status about the movable object. As discussed, the flight controller class can include functions for receiving and/or requesting access data to be used to control the movement of the movable object across various regions in a movable object environment.

Using the Flight Controller Class, an application can monitor the flight status, e.g. using instant messages. For example, the callback function in the Flight Controller Class can send back the instant message every one thousand milliseconds (1000 ms).

Furthermore, the Flight Controller Class allows a user of the application to investigate the instant message received from the movable object. For example, the pilots can analyze the data for each flight in order to further improve their flying skills.

In accordance with various embodiments, an application can use a ground station class 1407 to perform a series of operations for controlling the movable object.

For example, the SDK may require applications to have an SDK-LEVEL-2 key for using the Ground Station Class. The Ground Station Class can provide one-key-fly, on-key-go-home, manually controlling the drone by app (i.e. joystick mode), setting up a cruise and/or waypoints, and various other task scheduling functionalities.

In accordance with various embodiments, an application can use a communication component for establishing the network connection between the application and the movable object.

Figure 15:
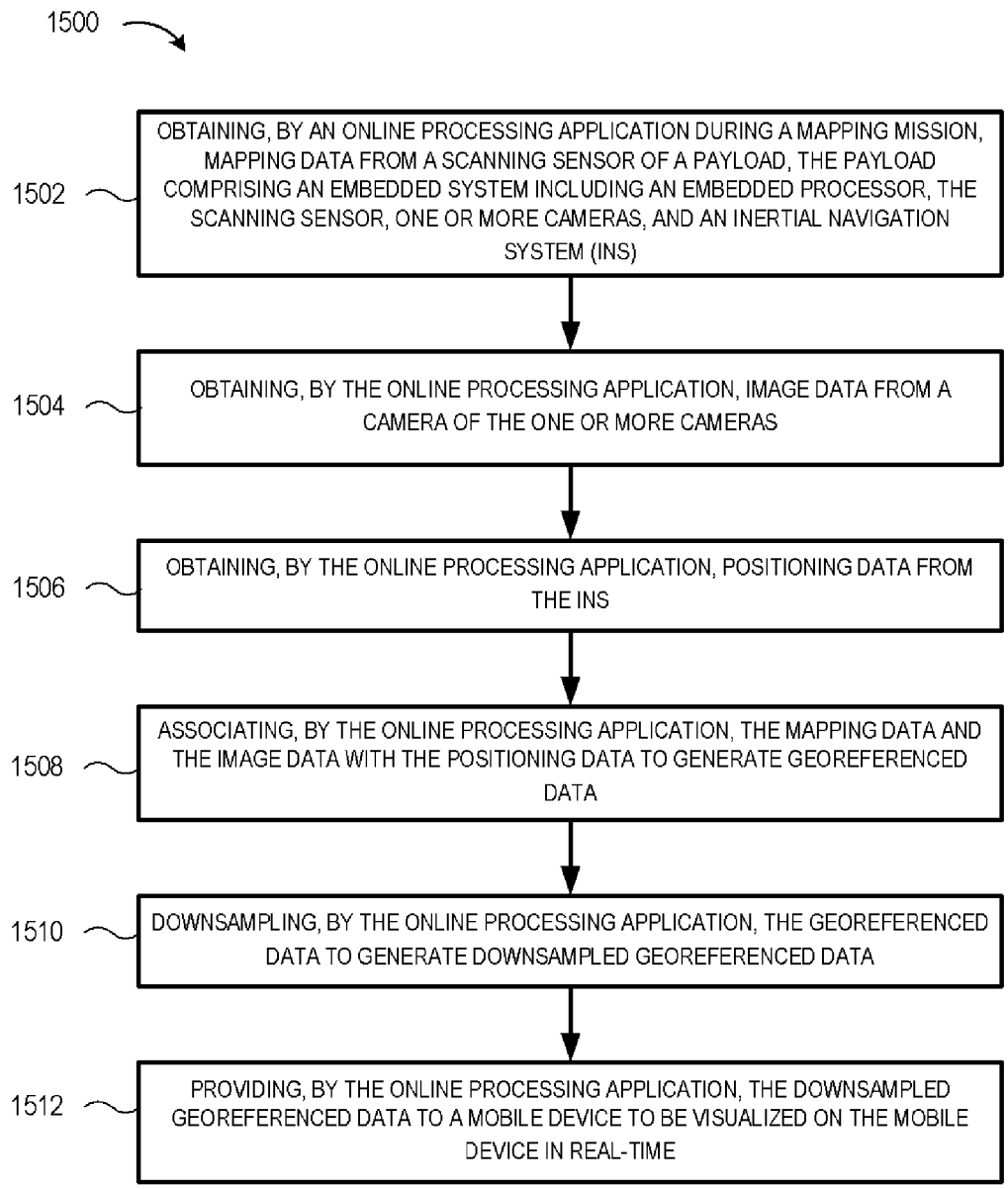
FIG. 15 shows a flowchart of a method of online point cloud processing of LiDAR and camera data, in accordance with various embodiments.

FIG. 15 shows a flowchart of a method of mapping using a payload in a movable object environment, in accordance with various embodiments. At operation/step 1502, the method can include obtaining, by an online processing application during a mapping mission, mapping data from a scanning sensor of a payload, the payload comprising an embedded system including an embedded processor, the scanning sensor, one or more cameras, and an inertial navigation system (INS). In some embodiments, the embedded processor, the scanning sensor, the one or more cameras, and the inertial navigation system (INS) are coupled to a shared circuit board. In some embodiments, the embedded processor, the scanning sensor, the one or more cameras, and the inertial navigation system (INS) share clock circuitry. In some embodiments, the embedded processor comprises a multi-core digital signal processor (DSP). In some embodiments, obtaining mapping data from the scanning sensor, further comprises reading a batch of mapping data from a circular buffer in memory of the payload, the circular buffer having a fixed size, extracting timestamp data associated with each point in the batch of mapping data, and converting each point in the batch of mapping data from a first coordinate system to a second coordinate system. In an embodiment, the first coordinate system is a polar coordinate system and the second coordinate system is a Cartesian coordinate system.

At operation/step 1504, the method can include obtaining, by the online processing application, image data from a camera of the one or more cameras. In some embodiments, image rectification is performed on the image data prior to it being obtained by the online processing application. As discussed, the camera can be an RGB color camera which obtains image data in the visible light spectrum.

At operation/step 1506, the method can include obtaining, by the online processing application, positioning data from the INS. In some embodiments, the positioning data can include fused INS data which uses RTK data to improve the accuracy of GNSS coordinate data (e.g., GPS etc.). In some embodiments, the fused INS data uses RTK data and IMU data for data fusion.

At operation/step 1508, the method can include associating, by the online processing application, the mapping data and the image data with the positioning data to generate georeferenced data. Georeferencing can be performed using the embedded processor (e.g., a DSP). For example, the mapping data can be received as a point cloud from a first frame of reference and then converted to a second frame of reference. This may be performed using a matrix representation of the mapping data which is then converted to a matrix representation from a different frame of reference using a transformation matrix. The calculations needed to perform this conversion can be performed in parallel using the embedded processor, such as a multi-core DSP. In some embodiments, the matrix multiplication operations can be performed using an embedded DSP and then the results can be assembled using an embedded CPU.

At operation/step 1510, the method can include downsampling, by the online processing application, the georeferenced data to generate downsampled georeferenced data. For online processing, downsampling of the georeferenced data can be simplified. For example, voxel grid downsampling can be performed where the positions of the points in a given voxel are averaged and then the averaged result becomes the representative point for that voxel. The amount of downsampling can then vary by varying the size of the voxels. In some embodiments, the points may be weighted by the accuracy of their position data. For example, points with a high variance can be lower weighted than points with a low variance. The resulting average will therefore favor the higher accuracy points over the lower accuracy points.

At operation/step 1512, the method can include providing, by the online processing application, the downsampled georeferenced data to a client device to be visualized on the client device in real-time. In some embodiments, the method can further include storing the georeferenced data and the image data to a removable storage medium (e.g., a SD card), wherein the removable storage medium is subsequently read by a computing device to perform post-processing on the georeferenced data. In some embodiments, the method can further include storing raw data of the mapping data, positioning data, and image data to a removable storage medium, wherein the removable storage medium is subsequently read by a computing device to perform post-processing on the georeferenced data. In some embodiments, a separate computing device can receive the removable storage medium, read the raw data of the mapping data, positioning data, and image data, and perform post-processing on the data.

In some embodiments, the method can further include performing feature-based registration on the downsampled georeferenced data to generate a plurality of local maps. In some embodiments, the method can further include performing pose optimization using the plurality of local maps.

In some embodiments, the method can further include interpolating roll, pitch, and yaw data of the positioning data to match a frequency of the mapping data; and extrapolating global navigation satellite service (GNSS) data of the positioning data based on a delay between the GNSS data and the mapping data. In some embodiments, the method can further include colorizing the downsampled georeferenced data based on one or more of the image data, intensity data, or height data.

Many features can be performed in, using, or with the assistance of hardware, software, firmware, or combinations thereof. Consequently, features may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features can be incorporated in software and/or firmware for controlling the hardware of a processing system, and for enabling a processing system to interact with other mechanism utilizing the results. Such software or firmware may include, but is not limited to, application code, device drivers, operating systems, and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description has been provided for the purposes of illustration and description. It is not intended to be exhaustive or to limit the invention to the precise forms disclosed. The breadth and scope should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

What is claimed is:

1. A system for mapping in a movable object environment, comprising:
    a movable object;
    a payload coupled to the movable object, the payload comprising an embedded system including an embedded processor, a scanning sensor, one or more cameras, and an inertial navigation system (INS); and
    a computing device;
    the payload further including an online processing application, the online processing application including first instructions which, when executed by the embedded processor, cause the online processing application to:
        obtain mapping data from the scanning sensor;
        obtain image data from a camera of the one or more cameras;
        obtain positioning data from the INS;
        associate the mapping data and the image data with the positioning data to generate georeferenced data;
        downsample the georeferenced data to generate downsampled georeferenced data;
        provide the downsampled georeferenced data to a client device to be visualized on the client device in real-time; and
        generate a first map based on the mapping data, the image data, and the positioning data collected by the payload;
    the computing device including a post-processing application, the post-processing application including second instructions which, when executed by a processor of the computing device, cause the post-processing application to:
        generate, after the first map is generated, a second map by using the mapping data, the image data, and the positioning data collected by the payload, a resolution of the second map being higher than a resolution of the first map.

2. The system of claim 1, wherein the first instructions, when executed, further cause the online processing application to:
    store the georeferenced data and the image data to a removable storage medium, wherein the removable storage medium is subsequently read by the computing device to perform post-processing on the georeferenced data.

3. The system of claim 1, wherein the first instructions, when executed, further cause the online processing application to:
store the mapping data, the positioning data, and the image data to a removable storage medium, wherein the removable storage medium is subsequently read by the computing device to perform post-processing on the georeferenced data.

4. The system of claim 3, wherein the second instructions, when executed, further cause the post-processing application to:
read the mapping data, the positioning data, and the image data from the removable storage medium, wherein the removable storage medium is removed from the movable object or the payload and provided to a removable storage medium reader of the computing device; and
perform high precision post-processing on the mapping data, the positioning data, and the image data to generate a post-processed file.

5. The system of claim 1, wherein the embedded processor, the scanning sensor, the one or more cameras, and the inertial navigation system (INS) are coupled to a shared circuit board.

6. The system of claim 5, wherein the embedded processor, the scanning sensor, the one or more cameras, and the inertial navigation system (INS) share clock circuitry.

7. The system of claim 6, wherein the clock circuitry generates a reference clock signal for providing synchronized time stamp data to the embedded processor, the scanning sensor, the one or more cameras, and the INS.

8. The system of claim 7, wherein the synchronized time stamp data is used for sensor data interpolation or extrapolation prior to generating the georeferenced data.

9. The system of claim 1, wherein the embedded processor comprises a multi-core digital signal processor (DSP).

10. The system of claim 1, wherein the first instructions, when executed, further cause the online processing application to:
perform feature-based registration on the downsampled georeferenced data to generate a plurality of local maps, including:
performing iterative closest point (ICP) algorithms directly on the downsampled georeferenced data to generate the plurality of local maps; and
identifying correspondence points in the plurality of local maps using the ICP algorithms, the correspondence points including a point in space that has been scanned multiple times from multiple poses.

11. A method, comprising:
obtaining, by an online processing application during a mapping mission, mapping data from a scanning sensor of a payload, the payload comprising an embedded system including an embedded processor, the scanning sensor, one or more cameras, and an inertial navigation system (INS);
obtaining, by the online processing application, image data from a camera of the one or more cameras;
obtaining, by the online processing application, positioning data from the INS;
associating, by the online processing application, the mapping data and the image data with the positioning data to generate georeferenced data;
downsampling, by the online processing application, the georeferenced data to generate downsampled georeferenced data;
providing, by the online processing application, the downsampled georeferenced data to a client device to be visualized on the client device in real-time;
generating, by the online processing application, a first map based on the mapping data, the image data, and the positioning data collected by the payload; and
generating, by a post-processing application, after the first map is generated, a second map by using the mapping data, the image data, and the positioning data collected by the payload after the first map is generated, a resolution of the second map being higher than a resolution of the first map.

12. The method of claim 11, further comprising:
performing feature-based registration on the downsampled georeferenced data to generate a plurality of local maps.

13. The method of claim 12, further comprising:
performing pose optimization using the plurality of local maps.

14. The method of claim 11, wherein image rectification is performed on the image data before the image is obtained by the online processing application.

15. The method of claim 11, wherein obtaining mapping data from the scanning sensor, comprises:
reading a batch of mapping data from a circular buffer in memory of the payload, the circular buffer having a fixed size;
extracting timestamp data associated with each point in the batch of mapping data; and
converting each point in the batch of mapping data from a first coordinate system to a second coordinate system.

16. The method of claim 11, further comprising:
interpolating roll, pitch, and yaw data of the positioning data to match a frequency of the mapping data; and
extrapolating global navigation satellite service (GNSS) data of the positioning data based on a delay between the GNSS data and the mapping data.

17. The method of claim 11, further comprising:
colorizing the downsampled georeferenced data based on one or more of the image data, intensity data, or height data.

18. One or more non-transitory computer readable storage media including instructions stored thereon which, when executed by one or more processors, cause the one or more processors to perform the method of claim 11.

19. The one or more non-transitory computer readable storage media of claim 18, wherein the embedded processor, the scanning sensor, the one or more cameras, and the inertial navigation system (INS) are coupled to a shared circuit board, wherein the embedded processor, the scanning sensor, the one or more cameras, and the inertial navigation system (INS) share clock circuitry.

20. A system for mapping in a movable object environment, comprising:
a movable object; and
a payload coupled to the movable object, the payload comprising an embedded system including an embedded processor, a scanning sensor, one or more cameras, and an inertial navigation system (INS);
the payload further including an online processing application, the online processing application including first instructions which, when executed by the embedded processor, cause the online processing application to:

obtain mapping data from the scanning sensor, including:
- reading a batch of mapping data from a circular buffer in memory of the payload, the circular buffer having a fixed size;
- extracting timestamp data associated with each point in the batch of mapping data; and
- converting each point in the batch of mapping data from a first coordinate system to a second coordinate system;

obtain image data from a camera of the one or more cameras;

obtain positioning data from the INS;

associate the mapping data and the image data with the positioning data to generate georeferenced data;

downsample the georeferenced data to generate downsampled georeferenced data; and provide the downsampled georeferenced data to a client device to be visualized on the client device in real-time.

* * * * *